(12) United States Patent
Uyama et al.

(10) Patent No.: US 9,290,613 B2
(45) Date of Patent: Mar. 22, 2016

(54) POLYLACTIC ACID RESIN COMPOSITION AND ADDITIVE FOR POLYLACTIC ACID RESIN

(75) Inventors: Hiroshi Uyama, Osaka (JP); Takahiko Terada, Osaka (JP); Takeshi Yanagimoto, Osaka (JP)

(73) Assignee: BIOBASE CORPORATION, Osaka-shi (JP)

( * ) Notice: Subject to any disclaimer, the term of this patent is extended or adjusted under 35 U.S.C. 154(b) by 3 days.

(21) Appl. No.: 13/144,323

(22) PCT Filed: Jan. 15, 2010

(86) PCT No.: PCT/JP2010/050439
§ 371 (c)(1),
(2), (4) Date: Jul. 13, 2011

(87) PCT Pub. No.: WO2010/082639
PCT Pub. Date: Jul. 22, 2010

(65) Prior Publication Data
US 2011/0275749 A1    Nov. 10, 2011

(30) Foreign Application Priority Data
Jan. 16, 2009 (JP) .................................. 2009-008229

(51) Int. Cl.
*C08G 63/08* (2006.01)
*C08L 67/04* (2006.01)

(52) U.S. Cl.
CPC .................. *C08G 63/08* (2013.01); *C08L 67/04* (2013.01); *C08L 2205/025* (2013.01)

(58) Field of Classification Search
CPC .... C08G 63/08; C08L 67/04; C08L 2205/025
USPC .................................. 525/410, 411, 415, 450
See application file for complete search history.

(56) References Cited

U.S. PATENT DOCUMENTS

| | | | |
|---|---|---|---|
| 5,180,765 | A | 1/1993 | Sinclair |
| 5,728,761 | A | 3/1998 | Kuyama et al. |
| 5,922,682 | A | 7/1999 | Brich et al. |
| 7,544,746 | B2 | 6/2009 | Sodergard et al. |
| 2007/0032405 | A1 | 2/2007 | DeFrees |
| 2008/0177009 | A1 * | 7/2008 | Sodergard et al. ............ 525/450 |
| 2008/0221265 | A1 * | 9/2008 | Sodergard et al. ............ 524/599 |
| 2009/0286075 | A1 * | 11/2009 | Nakamura et al. ............ 428/338 |
| 2010/0016628 | A1 * | 1/2010 | Uyama et al. ................. 560/182 |

FOREIGN PATENT DOCUMENTS

| | | | | |
|---|---|---|---|---|
| JP | 6306264 | A | 11/1994 | |
| JP | 9100401 | A | 4/1997 | |
| JP | 2000248164 | A | 9/2000 | |
| JP | 2003238668 | A | 8/2003 | |
| JP | 2005146274 | A | 6/2005 | |
| JP | 2005527678 | A | 9/2005 | |
| JP | 2006045433 | A | 2/2006 | |
| JP | 2006143829 | A | 6/2006 | |
| JP | 2006282940 | A | 10/2006 | |
| JP | 2006523211 | A | 10/2006 | |
| JP | 2007063516 | A | 3/2007 | |
| JP | 2008222768 | A | 9/2008 | |
| JP | 2008274068 | A | 11/2008 | |
| WO | 2004083258 | A2 | 9/2004 | |
| WO | WO 2007/116973 | | * 10/2007 | ............ C08L 101/00 |
| WO | 2008029527 | A1 | 3/2008 | |
| WO | WO 2008029527 | A1 * | 3/2008 | |

OTHER PUBLICATIONS

Karikari, A.S.; Synthesis and Characterization of Functional Biodegradable Polyesters, 2006.*
Biela, T., et al.; Journal of Polymer Science Part A: Polymer Chemistry, 2005, vol. 43, pp. 6116-6133.*
Biela, T., et al.; Macromolecules, 2006, vol. 39, p. 3710-3713.*
Li, H., et al.; Polymer, 2007, vol. 48, p. 6855-6866.*
Callari, J.; Micropellets: Little things mean a lot; Plastics World, Nov. 1994, p. 20-22.*
Wiggins, J.S., et al.; Polymer, 2006, p. 1960-1969.*

* cited by examiner

*Primary Examiner* — Robert Jones, Jr.
(74) *Attorney, Agent, or Firm* — The Webb Law Firm

(57) ABSTRACT

Provided is a polylactic acid resin composition which has excellent flexibility and heat resistance without decreasing a biomass degree. The polylactic acid resin composition includes a polylactic acid and a branched polylactic acid having at least three branched chains composed of a polylactic acid in the molecule can be obtained. This polylactic acid resin composition is very superior due to the following reasons: the resin composition has excellent flexibility because plasticization is accelerated; the resin composition has excellent heat resistance because crystallization is accelerated; and the resin composition is effective in protection of the global environment and measures against fossil resource depletion because the resin composition is derived from a recyclable resource.

7 Claims, 2 Drawing Sheets

POLYLACTIC ACID RESIN COMPOSITION AND ADDITIVE FOR POLYLACTIC ACID RESIN

TECHNICAL FIELD

The present invention relates to a polylactic acid resin composition and an additive for polylactic acid resin, in particular a polylactic acid resin composition that has excellent heat resistance and flexibility, and an additive for polylactic acid resin for use in the production thereof.

BACKGROUND ART

In recent years, there has been a desire to build a society of sustainable development, and materials are being actively developed using recyclable resources also in the field of polymeric materials. Polylactic acid can be synthesized from plant-derived materials and exhibits mechanical strength similar to that of conventional plastics, and has been attracting attention as an alternative to petroleum-derived plastics. However, polylactic acid is poor in heat resistance and flexibility, which poses a major challenge for developing a wide range of applications.

As an example of polylactic acid having enhanced flexibility, disclosed is a polylactic acid resin composition in which 10 to 40 wt % of lactic acid or lactide or 10 to 60 wt % of a linear lactic acid oligomer or a lactide oligomer is added to a polylactic acid (Patent Document 1). However, when a low-molecular compound is contained in the resin, it is likely to cause an ooze out, i.e., bleed out, on the surface. Since the low-molecular compound is compatible with the noncrystalline portion of the polylactic acid, the mobility of the molecular chain of this portion is increased with the additive. Application of external energy allows the noncrystalline portion to gradually crystallize, diminishing the compatible portion, where the low-molecular compound is pushed out on the surface. On the other hand, when a linear lactic acid oligomer of a relatively high molecular weight is blended, it is hardly to cause a bleed-out, unlike using a low-molecular compound. However, the added lactic acid oligomer may inhibit plasticization because it is crystallizable per se.

As another example of polylactic acid having enhanced flexibility, disclosed is a polylactic acid resin composition to which a lactic acid derivative is added (Patent Document 2). However, also in this case, the additive is a low-molecular compound and it is likely to cause a bleed-out depending on the added amount.

As still another example of polylactic acid having enhanced flexibility, disclosed is a resin composition composed of a cyclic lactic acid oligomer and a polylactic acid (Patent Document 3). The combination of the oligomer and the polymer both derived from lactic acid can impart flexibility, thus maintaining the transparency and the biomass degree (the proportion of plant-derived materials). However, there are problems of insufficient enhancement of plasticization, low yield of the cyclic lactic acid oligomer, and difficulty in the control of the molecular weight of the cyclic oligomer.

In addition, modification by blend for other resins and fillers has been investigated to impart flexibility to polylactic acid. However, there are problems of; for example, impaired transparency of polylactic acid and decrease in biomass degree.

Meanwhile, to enhance the heat resistance of polylactic acid, for example, an inorganic filler, such as talc or mica, having heat resistance is added to polylactic acid. Specifically, adding an inorganic filler having a high heat resistance to polylactic acid results in effects of improvement in the mechanical properties of the polylactic acid and hardening of the polylactic acid. However, it is difficult to ensure a sufficient heat resistance in practice by adding an inorganic filler to polylactic acid alone, which causes another problem, i.e., increased specific gravity.

Although polylactic acid can affect a crystalline structure, it is a macromolecule which is hardly to crystallize. When polylactic acid is molded in the same manner as ordinary commodity-grade resins, the molded article will be noncrystalline (amorphous), which has a poor mechanical strength and is likely to exhibit thermal denaturation.

In this regard, polylactic acid can be crystallized by performing heat treatment during or after molding, thus enhancing the heat resistance of the molded article. However, the method for crystallization by heat treatment has a problem in practice due to a long time required for crystallization. It takes a considerable amount of time to complete the crystallization through a heat treatment of a molded article of polylactic acid in a mold.

When polylactic acid is crystallized alone without adding a material that serves as a crystal nucleus for polylactic acid (homogeneous nucleation), the size of crystal is as large as approximately a micron order due to a low frequency of spontaneous generation of crystal nucleus. Thus, the crystal of polylactic acid causes light scattering per se. Accordingly, turbidity and less transparency occur, deteriorating practical effectiveness.

To address such a problem with regard to a polymer that can affect a crystalline structure, that is, to facilitate the crystallization of a polymer that can affect a crystalline structure, addition of a crystal nucleation agent (nucleating agent) has been investigated. The "nucleating agent" refers to that which serves as a primary crystal nucleus for a crystallizable polymer to facilitate crystal growth of the crystallizable polymer. In a broad sense, the "nucleating agent" may refer to that which facilitates the crystallization of a crystallizable polymer, i.e., that which accelerates the rate of the crystallization of a polymer. By adding a nucleating agent to a resin, the crystal of polymer can be refined, resulting in effects such as improved rigidity and enhanced transparency, and it is also advantageous in shortening the molding cycle when the crystallization is performed during molding since the nucleating agent increases the rate (that is, reduces the time) of the entire crystallization.

Examples of nucleating agents that facilitate the crystallization of polylactic acid include addition of talc, layered clay compounds, dimethyl sulfoisophthalate metal salts, copper phthalocyanine, alloys with polycarbonate, and the like. However, any of such nucleating agents are not plant-derived additives through the use of a recyclable resource, which cause decrease in biomass degree and is problematic.

As for an additive which does not result in decrease in the biomass degree, disclosed is a block polymer of component A composed of poly-D-lactic acid, or a copolymeric resin of D-lactic acid and starch, with component B composed of a biodegradable resin having a melting point or a softening point lower than those of polylactic acid, which is blended into a polylactic acid (Patent Document 4). However, since this additive has a poor compatibility with polylactic acid, it may impair the stable compatibility in the resin composition, which is problematic and thus is required to add a compatibilizer, causing decrease in biomass degree which is also problematic.

Disclosed is that an amino acid such as tryptophan or phenylalanine is blended into a polylactic acid (Patent Document 5). However, such an additive has a poor compatibility with polylactic acid, and it is necessary to control the particle size distribution and the added amount, and also to add an agglomeration inhibitor to prevent agglomeration, which would cause decrease in biomass degree and is problematic.

Furthermore, prior nucleating agents fail to provide a sufficient crystallization facilitating effect and there is a problem that a sufficient degree of crystallization, in turn, heat resistance, cannot be obtained from the same molding cycle as that used on ordinary commodity-grade resins. The melting point of polylactic acid is 170° C., and it is believed that such a problem is overcome if crystallization proceeds sufficiently.

Discloses is a star-branched polyester polyol obtained by polymerizing lactide or lactic acid using a fat and oil as an initiator (Patent Document 6). However, this branched polymer is low crystallizable and does not demonstrate an effect to facilitate crystallization when added to polylactic acid.

PRIOR ART DOCUMENTS

Patent Documents

[Patent Document 1] U.S. Pat. No. 5,180,765
[Patent Document 2] Japanese Laid-Open Patent Publication No. 9-100401
[Patent Document 3] Japanese Laid-Open Patent Publication No. 6-306264
[Patent Document 4] Japanese Laid-Open Patent Publication No. 2007-063516
[Patent Document 5] Japanese Laid-Open Patent Publication No. 2006-282940
[Patent Document 6] WO2008/29527

SUMMARY OF INVENTION

Problems to be Solved by the Invention

An object of the present invention is to provide a polylactic acid resin composition having excellent flexibility and heat resistance without decreasing the biomass degree. Another object of the present invention is to provide an additive for used in a polylactic acid resin, which is capable of improving flexibility and heat resistance when added to the polylactic acid resin.

Means for Solving the Problems

The inventors have found, as a result of having conducted extensive research to solve the foregoing problems, that the plasticization and the crystallization of polylactic acid are facilitated by adding, to a polylactic acid, another polylactic acid having a different molecular structure. Polylactic acid can demonstrate enhanced flexibility due to increased plasticization, and enhanced heat resistance due to increased crystallization. Therefore, the inventors have found that the flexibility and the heat resistance of polylactic acid can be enhanced by adding, to polylactic acid, another polylactic acid having a different molecular structure.

The "polylactic acid having a different molecular structure" above mentioned refers to a branched polylactic acid, which is composed of at the center a compound having at least three polar groups in the molecule, and branched chains, wherein each of the branched chains is a polylactic acid chain connected at the polar group of the starting point and having a hydroxy group at the terminal. The branched polylactic acid is a polymer having lactic acid as a constituent monomer, as with polylactic acid, however, is in a branched form and contains at the center a compound having at least three polar groups in the molecule, which inhibits the crystallization of the molecular chains. This allows the branched polylactic acid to be less crystallizable, have a lower melting point, and be more flexible. Therefore, when a branched polylactic acid of a relatively high molecular weight is added to a polylactic acid in order to prevent a bleed-out or other phenomena that have been regarded as problems, the plasticization of polylactic acid is not interrupted because the branched polylactic acid is noncrystallizable per se. Thus, the branched polylactic acid has a feature of having a great flexibility, despite a high molecule compound as with polylactic acid.

The inventors have found that the enhanced plasticization and flexibility of polylactic acid result from inhibition of the crystallization of polylactic acid and decrease of the intermolecular force of polylactic acid molecules by adding a branched polylactic acid to a polylactic acid. The branched polylactic acid and the polylactic acid have the same monomer unit and are thus highly compatible with regard to each other. Therefore, the branched polylactic acid-added polylactic acid can be highly plasticized to maintain its performance stably over time.

The inventors also have found that the crystallizability of a branched polylactic acid is enhanced by substituting a hydrogen with an acyl group in at least one of the terminal hydroxy groups of the branched chains of the branched polylactic acid. Such a branched polylactic acid is a polymer having lactic acid as a constituent monomer, as with polylactic acid, is a branched form and contains at the center a compound having at least three polar groups in the molecule. However, this branched polylactic acid is very highly crystallizable and results in rapid crystallization during the process of cooling following melted. Thus, the branched polylactic acid in which a hydrogen is substituted with an acyl group in at least one of the terminal hydroxy groups in the branched chains has a feature of very highly crystallizable, despite a high molecule compound as with polylactic acid.

Due to the addition of such a branched polylactic acid to a polylactic acid, the branched polylactic acid first generate a crystal, and the molecule of the polylactic acid is adsorbed onto the surface of the crystal. Thus, the crystallization proceeds epitaxially. The rate of crystallization is greatly enhanced to enhance the degree of crystallization, in turn, heat resistance. The crystal generation is facilitated also in a temperature range near the melting point, which removes the need to keep at high temperature as in conventional techniques, facilitating a crystal growth during rapid cooling. As with a catalyst in a chemical reaction, the branched polylactic acid facilitates crystallization through providing a "field" for crystal generation in the process of the crystallization.

The essence of the mechanism of action of the additive (nucleating agent) for facilitating crystallization is epitaxy, and the matching of the crystal lattice constant of the surface of the nucleating agent with the crystal lattice constant of the base resin determines the basic capabilities of the additive as a nucleating agent. Therefore, it is important to design a nucleating agent having on the surface a crystal structure close to the crystal structure of polylactic acid. In the present invention, the branched polylactic acid in which a hydrogen is substituted with an acyl group in at least one of the terminal hydroxy groups of the branched chains has the same monomer as the base resin polylactic acid, and thus is very much compatible on the crystal surfaces.

Since a polylactic acid and a branched polylactic acid have excellent compatibility at a molecule level with regard to each other, it is possible to provide a resin composition that has a highly stable compatibility and can maintain its performance stably over time. Moreover, since a polylactic acid and a branched polylactic acid have the same monomer, it is possible to provide a resin composition having good epitaxy and a high crystal nucleation rate. Furthermore, since a polylactic acid and a branched polylactic acid have small crystal size and similar refractive index due to their similar structures, it is possible to provide a transparent resin composition.

The crystallization of polylactic acid is facilitated with a branched polylactic acid containing a branched polylactic acid molecule is substituted with an acyl group in which hydrogen in at least one of the terminal hydroxy groups of the branched chains. That is, the branched polylactic acid in the present invention may be a mixture of a branched polylactic acid molecule in which the hydrogen in the terminal hydroxy group of a branched chain is substituted with an acyl group and a branched polylactic acid molecule in which the hydrogen in the terminal hydroxy group of a branched chain is unsubstituted, or may be composed of branched polylactic acid molecules in all of which the hydrogen in the terminal hydroxy group of a branched chain is substituted with an acyl group. When the branched polylactic acid is such a mixture, a higher proportion of branched polylactic acid molecule in which the hydrogen in the terminal hydroxy groups of the branched chains is substituted with an acyl group is preferable.

Since a branched polylactic acid and a polylactic acid to be blended therewith are composed entirely or mostly of plant-derived materials, a polylactic acid resin composition resulting from these components does not decrease a biomass degree.

The present invention was accomplished based on these findings, and provides an additive for polylactic acid resin, comprising a branched polylactic acid that has at least three branched chains composed of a polylactic acid in the molecule, the branched polylactic acid being obtained by polymerizing lactide, lactic acid, or polylactic acid using as an initiator at least one selected from the group consisting of polyether polyol having at least three hydroxy groups in the molecule, nucleoside, and sugar alcohol.

The term "polylactic acid" as simply used herein refers to a linear polylactic acid that having L-lactic acid and/or D-lactic acid as primary constituent(s) and has substantially no branches. Herein, the term is used in a sense not including "branched polylactic acid that has at least three branched chains composed of a polylactic acid in the molecule".

In one embodiment of the present invention, the polyether polyol having at least three hydroxy groups in the molecule is polyethylene glycol or polypropylene glycol.

In another embodiment of the present invention, the nucleoside is adenosine, guanosine, uridine, 5-methyluridine, or cytidine.

In still another embodiment of the present invention, the sugar alcohol is alditol produced by reduction of aldose having 3 to 8 carbon atoms.

In a certain embodiment of the present invention, the alditol is glycerol, erythritol, arabinitol, xylitol, sorbitol, or mannitol.

In still another embodiment of the present invention, the branched polylactic acid comprises a branched polylactic acid molecule in which a hydrogen is substituted with an acyl group in at least one of the terminal hydroxy groups of the branched chains composed of the polylactic acid.

In a certain embodiment of the present invention, the acyl group is derived from a dicarboxylic acid.

In another embodiment of the present invention, the acyl group is derived from a dicarboxylic acid forming a salt with a cation at a carboxyl group.

The present invention also provides an additive for polylactic acid resin, comprising a branched polylactic acid that has at least three branched chains composed of a polylactic acid in the molecule, the branched polylactic acid being obtained by polymerizing lactide, lactic acid, or polylactic acid using castor oil as an initiator, and the branched polylactic acid comprising a branched polylactic acid molecule in which a hydrogen is substituted with an acyl group derived from phthalic acid forming a salt with a cation at a carboxyl group in at least one of the terminal hydroxy groups of the branched chains composed of the polylactic acid.

The present invention also provides an additive for polylactic acid resin, comprising a branched polylactic acid that has at least three branched chains composed of a polylactic acid in the molecule, the branched polylactic acid having a number-average molecular weight of 4000 to 40000.

The present invention also provides an additive for polylactic acid resin, comprising a branched polylactic acid that has at least three branched chains composed of a polylactic acid in the molecule, the branched polylactic acid comprising a branched polylactic acid molecule having a molecular weight of 3000 or less in a proportion of 10 wt % or less.

The present invention also provides an additive for polylactic acid resin, comprising a branched polylactic acid that has at least three branched chains composed of a polylactic acid in the molecule, the branched polylactic acid having a melting point of 100 to 160° C.

The present invention also provides an additive for polylactic acid resin, comprising a branched polylactic acid that has at least three branched chains composed of a polylactic acid in the molecule, the branched polylactic acid having a heat of crystallization of 20 to 50 J/g when cooled at a cooling rate of 100° C./min following melted.

The present invention also provides an additive for polylactic acid resin, comprising a branched polylactic acid that has at least three branched chains composed of a polylactic acid in the molecule, the branched polylactic acid having a glass transition temperature of 30° C. or less.

The present invention also provides an additive for polylactic acid resin, comprising a branched polylactic acid that has at least three branched chains composed of a polylactic acid in the molecule, the branched polylactic acid comprising lactic acid which is L- or D-lactic acid having an optical purity of 94% or greater.

In one embodiment of the present invention, the branched polylactic acid is obtained by polymerizing lactide, lactic acid, or polylactic acid using as an initiator a compound having at least three polar groups in the molecule, and the branched polylactic acid comprises a branched polylactic acid molecule in which a hydrogen is substituted with an acyl group in at least one of the terminal hydroxy groups of the branched chains composed of the polylactic acid.

In a certain embodiment of the present invention, the compound having at least three polar groups in the molecule is at least one selected from the group consisting of fats and oils containing a triacylglycerol having at least three hydroxy groups in the molecule as a principal component, fats and oils containing a triacylglycerol having at least three epoxy groups in the molecule as a principal component, polyether polyol having at least three hydroxy groups in the molecule, nucleoside, and sugar alcohol.

In a certain embodiment of the present invention, the additive for polylactic acid resin is processed into a granulated form.

The present invention further provides a polylactic acid resin composition comprising a polylactic acid and an additive for polylactic acid resin comprising a branched polylactic acid that has at least three branched chains composed of a polylactic acid in the molecule.

In one embodiment of the present invention, the polylactic acid resin composition is that in which 1 to 30 parts by weight of the additive for polylactic acid resin is melt-blended with 100 parts by weight of the polylactic acid.

In another embodiment of the present invention, the polylactic acid resin composition is that in which 0.1 to 5 parts, by weight of talc or mica is further melt-blended.

In still another embodiment of the present invention, the polylactic acid resin composition is that in which 0.1 to 5 parts by weight of polyethylene glycol or polypropylene glycol is further melt-blended.

In still another embodiment of the present invention, the polylactic acid resin composition is that in which 1 to 30 parts by weight of at least one selected from the group consisting of diethylene glycol diacetate, ethylene glycol dibenzoate, diethylene glycol dibutyl ether, diethylene glycol diethyl ether, diethylene glycol dimethyl ether, monoolein, triacetin, tributyrin, triethylene glycol diacetate, triethylene glycol dimethyl ether, acetyl tributyl citrate, acetyl triethyl citrate, methyl acetyl ricinolate, adipic acid diester, fumaric acid diester, maleic acid diester, and sebacic acid diester is further melt-blended.

In a certain embodiment of the present invention, the polylactic acid resin composition is processed into a granulated form.

Effects of Invention

The present invention can provide a polylactic acid resin composition that demonstrates enhanced flexibility due to increased plasticization as well as enhanced heat resistance due to increased crystallization, and provide an additive for polylactic acid resin for use in the production thereof.

MODE FOR CARRYING OUT THE INVENTION

Hereinbelow, the present invention will now be described in more detail.

(Additive for Polylactic Acid Resin)

The additive for polylactic acid resin of the present invention is characterized by comprising a branched polylactic acid as described in detail below.

(Branched Polylactic Acid)

A branched polylactic acid constituting the additive of the present invention is designed to be composed of a recyclable resource. That is, a branched polylactic acid constituting the additive of the present invention is a branched polymer that has at least three branched chains each of having lactic acid as a constitutional unit (i.e., polylactic acid chains or lactic acid oligomer chains) in the molecule (see FIGS. 1 and 2).

The number of branched chains each of having lactic acid as a constitutional unit is not limited to 3, and it may be 3 or greater, for example, 3 to 12, and preferably 3 to 8. Also, the skeletal structure of the branched polymer may take various forms, such as, in addition to the star-branched example shown in FIG. 1, comb, dendritic, and starburst forms.

Figure 2:
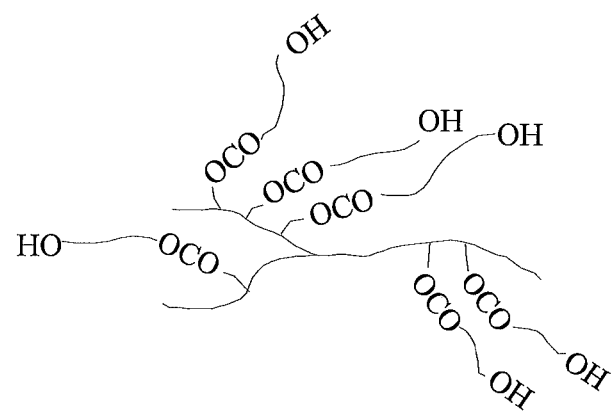
FIG. 2 is a schematic diagram showing another embodiment of the synthesis and the structure of branched polylactic acid constituting the additive for polylactic acid resin of the present invention.

A specific example may be a branched polylactic acid in which the carboxy terminal of polylactic acid is ester-bonded to each of the hydroxy groups of a fat and oil (triacylglycerol) that has at least three hydroxy groups in the molecule (FIG. 2).

Alternatively, another example may be a branched polylactic acid in which the carboxy terminal of polylactic acid is ester-bonded to each of the ring-opened epoxy groups of a fat and oil (triacylglycerol) that has at least three epoxy groups in the molecule (FIG. 2).

Figure 1:
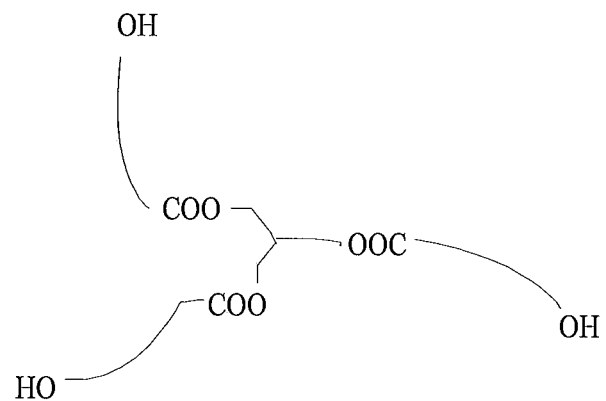
FIG. 1 is a schematic diagram showing one embodiment of the synthesis and the structure of branched polylactic acid constituting the additive for polylactic acid resin of the present invention.

Alternatively, another example may be a branched polylactic acid in which the carboxy terminal of polylactic acid is ester-bonded to each of the hydroxy groups of a polyether polyol having at least three hydroxy groups in the molecule (FIG. 1).

Figure 3:
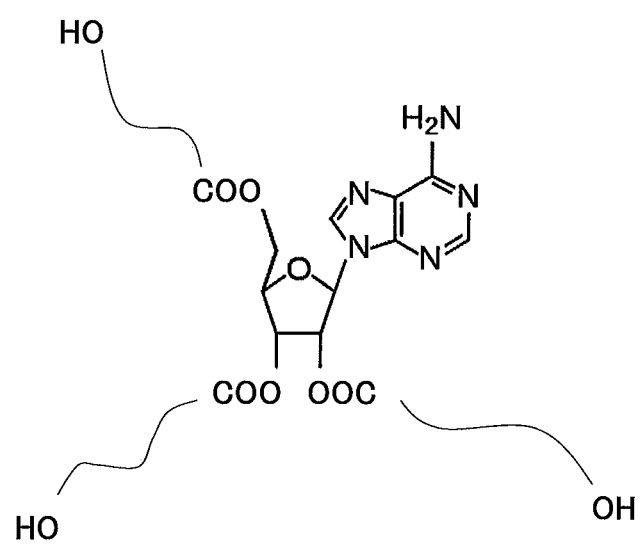
FIG. 3 is a schematic diagram showing a still another embodiment of the synthesis and the structure of branched polylactic acid constituting the additive for polylactic acid resin of the present invention.

Alternatively, another example may be a branched polylactic acid in which the carboxy terminal of polylactic acid is ester-bonded to each of the hydroxy groups of a nucleoside (FIG. 3).

Alternatively, another example may be a branched polylactic acid in which the carboxy terminal of polylactic acid is ester-bonded to each of the hydroxy groups of a sugar alcohol (FIG. 1).

Accordingly, at least three polylactic acid chains extend from a fat and oil, a polyether polyol, a nucleoside, or a sugar alcohol as a starting point, and a hydroxy group is present at each polylactic acid chain terminal. Such a branched polylactic acid has a lower glass transition temperature, a lower melting point, and a lower degree of crystallization than a linear polylactic acid of an equivalent molecular weight. Depending on the configuration of the fat and oil and the polylactic acid chain, the branched polylactic acid may be noncrystallizable.

In a branched polylactic acid constituting the additive of the present invention, the lactic acid component constituting the branched chain having lactic acid as a constitutional unit (i.e., a polylactic acid chain or a lactic acid oligomer chain) may be L-lactic acid (hereinafter sometimes referred to as an L-isomer), D-lactic acid (hereinafter sometimes referred to as a D-isomer), or a mixture of the D-isomer and the L-isomer such as a racemate (hereinafter sometimes referred to as a DL-isomer).

As also illustrated in the Examples below, a branched polylactic acid that contains the D-isomer (D-isomer or DL-isomer) as a lactic acid component is expected to exert a greater plasticization facilitating effect on ordinary polylactic acid. However, even when the lactic acid component of the branched polylactic acid is composed solely of the L-isomer, a sufficient modification effect is exerted on ordinary polylactic acid. In terms of cost, a branched polylactic acid composed of the L-isomer is also sufficiently preferable.

Regarding the branched polylactic acid in which a hydrogen is substituted with an acyl group in at least one of the terminal hydroxy groups of the branched chains, the higher the optical purity of the component lactic acid (L-isomer or D-isomer), the greater the crystallinities. By adding such a branched polylactic acid to a polylactic acid, the rate of crystallization of polylactic acid can be enhanced even more to further enhance the degree of crystallization, in turn, heat resistance.

It is preferable that a branched polylactic acid constituting the additive of the present invention contains a branched polylactic acid molecule in which a hydrogen is substituted with an acyl group in the terminal hydroxy group of at least one of the branched chains composed of a polylactic acid. By the condensation between the terminal hydroxy group and a carboxylic acid, it can be produced that a branched polylactic acid in which the hydrogen in the terminal hydroxy group is substituted with an acyl group.

By substituting a hydrogen with an acyl group in at least one of the terminal hydroxy group of the branched chains, such a branched polylactic acid is added to polylactic acid to facilitate the crystallization of polylactic acid. When a polylactic acid resin composition from that such a branched polylactic acid is blended with a polylactic acid is cooled following melted, first the highly crystallizable branched polylactic acid induces crystal nucleation, and then crystal of the polylactic acid grows so as to conform to the crystal of the branched polylactic acid. In this manner, the crystallization of polylactic acid is facilitated by the branched polylactic acid to enhance the degree of crystallization, i.e., heat resistance.

The acyl group (R—CO—) may be an acyl group represented by the formula where R is H or a saturated or unsaturated hydrocarbon residue having 1 to 14 carbon atoms. Examples include a formyl group, an acetyl group, a propionyl group, a butynyl group, a benzoyl group, and the like.

The acyl group may be derived from a dicarboxylic acid. The dicarboxylic acid (HOOC—R—COOH) may be a dicarboxylic acid represented by the formula where R is H or a saturated or unsaturated hydrocarbon residue having 1 to 14 carbon atoms. Examples include oxalic acid, malonic acid, succinic acid, phthalic acid, glutaric acid, adipic acid, and the like.

Also, the acyl group may be derived from a dicarboxylic acid forming a salt with a cation at a carboxyl group. At least one of the terminal hydroxy groups of the branched chains composed of a polylactic acid of a branched polylactic acid can be condensed with a dicarboxylic acid, and then neutralized with an alkali such as a metal hydroxide or a metal alcoholate to produce a branched polylactic acid in which hydrogen is substituted with an acyl group derived from a dicarboxylic acid forming a salt with a cation at a carboxyl group in at least one of the terminal hydroxy groups of the branched chains composed of a polylactic acid. The dicarboxylic acid (HOOC—R—COOH) may be a dicarboxylic acid represented by the formula where R is H or a saturated or unsaturated hydrocarbon residue having 1 to 14 carbon atoms. Examples include oxalic acid, malonic acid, succinic acid, phthalic acid, glutaric acid, adipic acid, and the like.

The molecular weight of the branched polylactic acid constituting the additive of the present invention is not particularly limited insofar as providing the desired mechanical properties, flexibility, crystallinity, and other properties complying with the intended use of the resulting polylactic acid resin composition. The molecular weight may depend on the molecular weight, optical properties, and other properties of a polylactic acid used in combination. It may preferably be a number-average molecular weight of 4000 to 40000 and more preferably 5000 to 15000.

A branched polylactic acid constituting the additive of the present invention preferably contains a branched polylactic acid molecule having a molecular weight of 2000 or less preferably in a proportion of 10 wt % or less and more preferably 5 wt % or less. A branched polylactic acid molecule having a molecular weight of 3000 or less is more preferably contained preferably in a proportion of 10 wt % or less and more preferably 5 wt % or less.

A branched polylactic acid constituting the additive of the present invention preferably has a melting point of 100 to 160° C. and more preferably 120 to 160° C.

A branched polylactic acid constituting the additive of the present invention preferably has a heat of crystallization of 20 to 50 J/g, and more preferably of 30 to 50 J/g, when cooled at a cooling rate of 100° C./min following melted.

A branched polylactic acid constituting the additive of the present invention preferably has a glass transition temperature of 30° C. or less and more preferably 20° C. or less.

In a branched polylactic acid constituting the additive of the present invention, the lactic acid (L-isomer or D-isomer) as constituent preferably has an optical purity of 94% or greater, more preferably 96% or greater, and still more preferably 98% or greater.

Such branched polylactic acid may be obtained by, for example, either (a1) polymerizing lactide via ring-opening or (b1) polymerizing lactic acid or polylactic acid via dehydrative condensation, using as an initiator a fat and oil that contains a triacylglycerol having at least three hydroxy groups in the molecule as a principal component. Alternatively, such branched polylactic acid may be obtained by either (a2) polymerizing lactide via ring-opening or (b2) polymerizing lactic acid or polylactic acid via dehydrative condensation, using as an initiator a fat and oil that contains a triacylglycerol having at least three epoxy groups in the molecule as a principal component. Alternatively, such branched polylactic acid may be obtained by either (a3) polymerizing lactide via ring-opening or (b3) polymerizing lactic acid or polylactic acid via dehydrative condensation, using as an initiator a fat and oil that contains a polyether polyol having at least three hydroxy groups in the molecule. Alternatively, such branched polylactic acid may be obtained by either (a4) polymerizing lactide via ring-opening or (b4) polymerizing lactic acid or polylactic acid via dehydrative condensation, using a nucleoside as an initiator. Alternatively, such branched polylactic acid may be obtained by either (a5) polymerizing lactide via ring-opening or (b5) polymerizing lactic acid or polylactic acid via dehydrative condensation, using a sugar alcohol as an initiator.

The "polymerization" as used herein refers to one or more chemical reactions intended to synthesize a polymer.

The additive of the present invention may be obtained as solid matter (lumps or powders). By further subjecting the additive of the present invention to a granulation operation, it may be processed into a granulated form. Examples of the granulated form include granules, pellets, tablets, and like forms. The granulation operation may be performed using any procedure and device commonly employed by a person skilled in the art.

(Initiator)

A branched polylactic acid constituting the additive of the present invention may be synthesized by polymerizing lactide, lactic acid, or polylactic acid using, as an initiator, a compound having at least three hydroxy or epoxy groups in the molecule. Examples of such initiators include fats and oils, polyether polyols, nucleosides, sugar alcohols, and the like. These initiators will now be described hereinbelow.

(Fat and Oil)

A fat and oil for use as the initiator contain a triacylglycerol having at least three hydroxy groups in the molecule or a triacylglycerol having at least three epoxy groups in the molecule as a principal component, hereinafter, may be sometimes referred to as either a hydroxylated fat and oil or an epoxidized fat and oil.

Herein, the "fat and oil" refers to a fat and oil containing as a principal component an ester of a fatty acid having a large number of carbon atoms (higher fatty acid), specifically a fatty acid having 8 or more carbon atoms, more preferably 14 to 20 carbon atoms (higher fatty acid), with glycerol, encompassing oils such as salad oil and soybean oil that are liquid at ordinary temperatures and fats such as lard and beef tallow that are solid. According to the present invention, fats and oils derived from natural sources are preferable in terms of being recyclable resources. Such fats and oils can be obtained by any means commonly employed by a person skilled in the art. For example, in order to obtain such fats and oils, the starting material such as beans and seeds is subject to pre-treatment such as threshing, pulverization, and steaming (heat treatment), followed by oil extracting by rendering, miffing, extraction, or a like method, and purification such as degumming, deoxidation, decolorization, and deodorization.

Fats and oils have various features depending on the type of constituent fatty acid. According to the present invention, a fat and oil that contains as a principal component a triacylglycerol having a large number of hydroxy groups which can serve as the starting point is preferable as an initiator. Examples of such fats and oils include corn oil, sesame oil, peanut oil, kapok oil, castor oil, and the like.

Castor oil is a vegetable oil extracted from seeds of *Ricinus communis* belonging to the Euphorbiaceae family, and about 90% of the constituent fatty acids thereof is hydroxy group-containing recinoleic acid, which is a kind of unsaturated fatty acid. Castor oil is preferable as an initiator in that it has a greater hydroxyl value of 155 to 177 mg KOH/g than most fats and oils having a hydroxyl value of 10 mg KOH/g. In a branched polylactic acid additive of the present invention using castor oil as an initiator, preferable amounts of materials for polymerization are 1.9 to 20 parts by weight of castor oil per 100 parts by weight of dehydrated lactic acid, 2.3 to 25 parts by weight of castor oil per 100 parts by weight of lactide, and 2.3 to 25 parts by weight of castor oil per 100 parts by weight of polylactic acid.

Polycastor oil is a polymer of castor oil. The unsaturated bond (C=C) derived from recinoleic acid in the castor oil molecule undergoes radical polymerization using organic peroxide as an initiator, yielding a polycastor oil. Polycastor oil has a more branched structure than castor oil, and has a more number of hydroxy groups in the molecule than that in castor oil. Therefore, polycastor oil contains many hydroxy groups which can serve as the starting point for polymerization, and has a more branched structure, and is thus more preferable as an initiator in the production of a branched polylactic acid constituting the additive of the present invention.

Alternatively, a hydroxylated fat and oil, obtained by introduced a hydroxy group into a carbon-carbon unsaturated bond in an unsaturated fatty acid such as linolic acid or oleic acid, can also be used as an initiator in the production of a branched polylactic acid constituting the additive of the present invention. Examples of hydroxylated fats and oils include hydroxylated soybean oil, hydroxylated linseed oil, hydroxylated rapeseed oil, hydroxylated palm oil, hydroxylated corn oil, and the like.

According to the present invention, a fat and oil that contains a triacylglycerol having a large number of epoxy groups which can serve as the starting point as a principal component is also preferable as an initiator. An epoxidized fat and oil, obtained by introducing an epoxy group into a carbon-carbon unsaturated bond derived from an unsaturated fatty acid such as linolic acid or oleic acid, can be used as an initiator in the production of a branched polylactic acid constituting the additive of the present invention. Examples of epoxidized fats and oils include epoxidized soybean oil, epoxidized linseed oil, epoxidized palm oil, and the like, which have been industrially used as additives, for example, for imparting plasticity to resins such as vinyl chloride resins.

For the fats and oils that contain a hydroxy group or an epoxy group as described above, hydrogenated oils, obtained by adding hydrogen to the unsaturated group of a constituent fatty acid to form a saturated fatty acid, can also be used. Such a hydrogenated oil can be used to increases the thermal stability, modify the solubility, and enhance the compatibility with rosins, waxes, rubbers, polyethylene, and the like of the resulting branched polylactic acid. Also, a hydrogenated oil can be blended with other waxes to enhance the solvent resistance, the grease resistance, and the hardness of the resulting branched polylactic acid.

The fat and oil used as an initiator may be a mixture of fats and oils composed of different fatty acids, and may also contain a fat and oil having three or fewer hydroxy groups or epoxy groups in the molecule as an impurity. Fats and oils are often not a pure substance but a mixture, and a fat and oil which contains at least three hydroxy or epoxy groups in the molecule as a principal component is sufficiently used. In the fat and oil used as an initiator, the proportion of fat and oil having at least three hydroxy or epoxy groups is preferably 50 wt % or greater and more preferably 70 wt % or greater. When the proportion is less than 50 wt %, a branched polylactic acid in a linear configuration is formed in a large amount, leading to increase of the glass transition temperature, the melting point, and the degree of crystallization.

(Polyether Polyol)

A polyether polyol for use as the initiator has at least three hydroxy groups in the molecule. Herein, the "polyether polyol" refers to a polymer that is polymerized via the ether link of glycol or a like monomer and that has a plurality of hydroxy groups. Examples of polyether polyols used as initiators include polyethylene glycol (obtained by polymerizing ethyleneoxide), polypropylene glycol (obtained by polymerizing propylene oxide), polybutylene glycol, and the like, with polyethylene glycol and polypropylene glycol being preferable.

(Nucleoside)

A nucleoside for use as the initiator has at least three hydroxy groups in the molecule. Herein, a nucleoside is collectively used to encompass compounds in which a base such as purine or pyrimidine is glycosidically bonded with a sugar. Examples of purine bases include adenine, guanine, and the like. Examples of pyrimidine bases include thymine, cytosine, uracil, and the like. Examples of other bases include nicotinamide, dimethyl isoalloxazine, and the like. Examples of sugars include deoxyribose, ribose, and the like. Examples of the nucleoside used as an initiator include adenosine, thymidine, guanosine, cytidine, uridine, vitamin B2, and the like, with adenosine, guanosine, uridine, 5-methyluridine, and cytidine being preferable.

(Sugar Alcohol)

A sugar alcohol for use as the initiator has at least three hydroxy groups in the molecule. Herein, the "sugar alcohol" refers to a chain polyhydric alcohol in which the carbonyl group of a sugar such as aldose (aldehyde group-containing monosaccharide) and ketose (ketone group-containing monosaccharide) is reduced. The sugar alcohol used as an initiator is preferably alditol produced by reduction of aldose having 3 to 8 carbon atoms. Examples of alditols include glycerol, erythritol, arabinitol, xylitol, sorbitol, mannitol, threitol, allitol, iditol, and the like, with glycerol, erythritol, arabinitol, xylitol, sorbitol, and mannitol being preferable.

(Lactide and Lactic Acid)

A branched polylactic acid constituting the additive of the present invention can be synthesized by polymerizing lactide, lactic acid, or polylactic acid using the initiator as mentioned above.

Lactic acid can be obtained from an assimilable carbon source such as glucose via fermentation by a microorganism such as a lactic acid bacterium. The carbon source glucose can be produced via hydrolysis from many recyclable resources including cellulose and starch while can be also obtained in a petro-industrial manner. Therefore, lactic acid is also a recyclable resource. According to the present invention, a lactic acid fermentation liquor may be directly used, lactic acid isolated from a lactic acid fermentation liquor may be used, and commercially available lactic acid may be used.

Herein, the "lactide" refers to a cyclic diester that can be obtained by dehydrative condensation of two molecules of lactic acid. Therefore, it is a recyclable resource. According to the present invention, commercially available lactide can be used.

There are optical isomers of lactic acid and lactide. The L-isomer is mostly obtained via the fermentation by a lactic acid bacterium. However, some microorganisms (such as *Lactobacillus lactis*, *Lactobacillus bulgaricus*, and *Leuconostoc cremoris*) generate the D-isomer. By subjecting several species of microorganisms including such microorganisms together to fermentation, DL-lactic acid (racemate) can be obtained. Also, by the racemization of L-lactic acid by a lactic acid racemase-producing microorganism, DL-lactic acid can be produced.

(Production of Branched Polylactic Acid by Ring-opening Polymerization of Lactide)

Since lactide has a structure formed by cyclization of two lactic acid molecules, lactide can be ring-opening polymerized to synthesize a polylactic acid chain. For example, lactide and an initiator (a hydroxylated fat and oil, an epoxidized fat and oil, a polyether polyol, a nucleoside, or a sugar alcohol) are introduced into a sufficiently dried container, the container is purged with an inert gas, a catalyst is introduced, and heating with stirring are performed. Thus, a branched polylactic acid can be produced with a polylactic acid chain formed by ring-opening polymerization of lactide starting from the initiator.

In the case of that an epoxidized fat and oil is used as an initiator, the ring-opening polymerization of lactide may be carried out after a lactide is added to a fat and oil to synthesize a lactide-modified fat and oil. Alternatively, a polylactic acid may be obtained by homopolymerizing lactide, and then be added to a fat and oil.

Examples of catalysts usable on polymerizing lactide may be those commonly employed by a person skilled in the art. Specific examples include a porphyrin aluminium complex, $(n-C_4H_9O)_4Al_2O_2Zn$, composite metal cyanide complex, tin dichloride ($SnCl_2$), tin 2-ethylhexanoate, diethylzinc-water or diethylcadmium, aluminium triisopropoxide, titanium tetrabutoxide, zirconium tetrapropoxide, tributyltin methoxide, tetraphenyltin, lead oxide, zinc stearate, bismuth 2-ethylhexanoate, potassium alcoholate, antimony fluoride catalyst, and stannous octoate catalyst. Tin dichloride ($SnCl_2$) and tin 2-ethylhexanoate are particularly preferable in terms of yield.

There is no particular limitation to the amount of catalyst used, and the amount of catalyst is suitably about 0.0001 to 5 parts by weight and preferably about 0.05 to 1 part by weight per 100 parts by weight of lactide.

There is no particular limitation to the inert gas, and examples include nitrogen gas and argon gas.

The aforementioned polymerization reaction may be carried out at ordinary temperatures or carried out under heating if necessary. Preferably, it is carried out under heating to 100° C. to 180° C. and more preferably to 120° C. to 160° C. A temperature less than 100° C. is not preferable in that it causes a lower rate of reaction. A temperature higher than 180° C. is problematic in that it causes a higher rate of the decomposition of the branched polylactic acid and the occurrence of evaporation of a low-molecular polymer.

(Production of Branched Polylactic Acid by Dehydrative Condensation Polymerization of Lactic Acid or Polylactic Acid)

Since lactic acid is a compound having a carboxyl group and a hydroxy group in one molecule, lactic acid can be polymerized via condensation to synthesize a polylactic acid chain. For example, lactic acid and an initiator (a hydroxylated fat and oil, an epoxidized fat and oil, a polyether polyol, a nucleoside, or a sugar alcohol) are introduced into a sufficiently dried container, a catalyst is introduced as needed, and heating or heating under reduced pressure is performed. Thus, a branched polylactic acid can be obtained with a polylactic acid chain formed by condensation polymerization of lactic acid starting from the initiator. Water generated by polymerization may be discharged out of the reaction system to further increase the degree of polymerization.

In the case of an epoxidized fat and oil is used as an initiator, the dehydrative condensation polymerization of lactic acid may be carried out after a lactic acid is added to a fat and oil to synthesize a lactic acid-modified fat and oil. Alternatively, a polylactic acid may be obtained by homopolymerizing lactic acid, and then be added to a fat and oil.

In the case of solution polymerization using a solvent, the temperature of the polymerization reaction may be from the azeotropic point of water to be removed and the solvent to the boiling point of the solvent. However, it is preferable that heating is carried out at a temperature up to 200° C. This is because the higher the temperature, the more likely the fat and oil component undergoes modification. For example, castor oil decomposes at 200° C. or higher. To achieve dehydration, it is preferable to carry out heating preferably for a duration suitable to attain a suitable degree of polymerization (for example, 1 to 24 hours) at the azeotropic temperature or higher (for example, a temperature of 90° C. to 180° C. is preferable).

When polymerization is carried out by heating under reduced pressure, a lactide may be generated via the depolymerization reaction of a lactic acid oligomer during the course of lactic acid polymerization. Lactide is a contaminant in such a lactic acid polymerization. A higher temperature or a higher vacuum is more likely to generate a lactide. The generated lactide disappears by sublimation from the system, thereby reducing the yield of a polylactic acid chain. Therefore, it is preferable that the heating temperature is 100° C. to 180° C. and the pressure is reduced to 670 Pa to 13000 Pa. A pressure higher than 13000 Pa causes a higher moisture content in the reaction system, delaying the condensation. A pressure lower than 670 Pa causes the generation and sublimation of lactide, leading to decrease in yield of the product to be collected.

Examples of catalysts usable on polymerizing lactic acid may be those commonly employed by a person skilled in the art. Specific examples include tin dichloride ($SnCl_2$), tin 2-ethylhexanoate, tetraphenyltin, tin oxide, sulfuric acid, tin powder, toluenesulfonic acid, and the like.

Although the rate of the polymerization reaction is lowered, it is possible to carry out polymerization without a catalyst. Especially, to produce a relatively lower molecular branched polylactic acid, the catalyst is not essential because the proportion of lactic acid relative to the initiator is small.

The method employed to discharge water out of the reaction system may be any method commonly employed by a person skilled in the art. For example, water is removed from the reaction system by azeotropy with a solvent. Examples of solvents that can be used in azeotropy with water include toluene, xylene, mesitylene, ethylbenzene, mineral spirits, and the like. By increasing the temperature to the azeotropic point with water or higher in such a solvent, water can be evaporated out of the reaction system to facilitate the dehydrative condensation of lactic acid.

Also, since toluene, xylene, mesitylene, ethylbenzene, and mineral spirits have a specific gravity of less than 1, they can be separated from water by taking advantage of specific gravity. Such a solvent is heated together with water at the azeotropic point or higher to evaporate the azeotrope for water and the solvent, and then cooled to give a condensate. Since the solvent and water have different specific gravities, the condensate separates into water and the solvent. Water thus separated can be eliminated. Further, the solvent can be recovered and circulated in the reaction system for reuse.

Specifically, the azeotrope for water and the solvent is evaporated out of the thermal reactor by heating, and then is condensed in a condenser tube, and sent to a water separator to separate into water in the lower layer and a solvent in the upper layer according to the difference in specific gravity. Therefore, it is preferable that a thermal reactor equipped with a vapor outlet is provided with a condenser tube and a water separator such as a decanter or a Dean-Stark trap. In the water separator, water in the lower layer can be removed out of the system, and the solvent in the upper layer can be returned and circulated in the thermal reactor. It is thus possible to remove water from the lactic acid condensation reaction system without consumption or leakage of solvent.

Polylactic acid may be used in place of lactic acid as used above. In this case, the greater the molecular weight of the polylactic acid used, the less likely the polymerization reaction proceeds. Nonetheless, a branched polylactic acid can be obtained by polymerizing one or more polylactic acid molecules starting from the polar groups of the initiator.

(Acylation of Branched Polylactic Acid)

As described above, it is preferable that the branched polylactic acid constituting the additive of the present invention contains a branched polylactic acid molecule in which a hydrogen is substituted with an acyl group in at least one of the terminal hydroxy groups of the branched chains composed of a polylactic acid. A terminal hydroxy group of the branched polylactic acid may be condensed with a carboxylic acid to produce a branched polylactic acid in which a terminal is acylated. A carboxylic acid chloride or a carboxylic anhydride may be allowed to act on a branched polylactic acid to achieve an acylation. For example, for the substitution with an acetyl group, which is an acyl group, acetyl chloride or acetic anhydride can be allowed to act on a branched polylactic acid in the presence of a base such as pyridine or triethylamine to acetylate a terminal hydroxy group.

Alternatively, it is preferable that the branched polylactic acid contains a branched polylactic acid molecule in which a hydrogen is substituted with an acyl group derived from a dicarboxylic acid in at least one of the terminal hydroxy groups of the branched chains composed of polylactic acid. A dicarboxylic acid chloride or a dicarboxylic anhydride may be allowed to act on a terminal hydroxy group of the branched polylactic acid to produce a branched polylactic acid in which a terminal hydroxy group is ester-bonded with a dicarboxylic acid. For example, phthalic anhydride can be allowed to act on the branched polylactic acid in the presence of a base such as pyridine or triethylamine to esterify a terminal hydroxy group of the branched polylactic acid with a dicarboxylic acid.

Furthermore, it is preferable that the branched polylactic acid contains a branched polylactic acid molecule in which a hydrogen is substituted with an acyl group derived from a dicarboxylic acid forming a salt with a cation at a carboxyl group in at least one of the terminal hydroxy groups of the branched chains composed of a polylactic acid. A dicarboxylic acid chloride or a dicarboxylic anhydride may be allowed to act on a terminal hydroxy group of the branched polylactic acid and neutralizing it with a base to produce a branched polylactic acid in which a terminal hydroxy group is ester-bonded with a dicarboxylate. For example, phthalic anhydride can be allowed to act on a branched polylactic acid in the presence of a base such as pyridine or triethylamine and neutralized with sodium hydroxide to esterify a terminal hydroxy group of the branched polylactic acid with a dicarboxylate. After neutralization, the insoluble ester formed with a dicarboxylate is collected by centrifugation, filtration, or the like, and then washed. Thus, a branched polylactic acid in which the hydrogen in a terminal hydroxy group is substituted with an acyl group derived from a dicarboxylic acid forming a salt with a cation at a carboxyl group can be obtained.

(Production of Branched Polylactic Acid from Lactic Acid Fermentation Liquor)

While lactic acid used as the starting material of the above-described branched polylactic acid may be produced by chemical synthesis, it is mostly produced by lactic acid fermentation by a lactic acid bacterium. Therefore, a lactic acid may be obtained as a lactic acid fermentation liquor.

The "lactic acid fermentation liquor" refers to an aqueous liquid in which lactic acid is generated from an assimilable carbon source such as glucose via lactic acid fermentation by a microorganism such as a lactic acid bacterium. The lactic acid fermentation liquor contains a bacterium such as a lactic acid bacterium, lactic acid produced by fermentation, a carbon source such as glucose that has not been assimilated, by-products (acetic acid, formic acid, etc.), medium components that are nutrients of the bacterium, and the like. Different medium components are required depending on the type of bacterium, and examples of medium components include organic components such as amino acids, peptides, vitamins, nucleotides and surfactants, and inorganic salts and organic acid salts such as phosphates, sulfates, acetates, and citrates. For example, the MRS (de Man-Rogosa-Sharpe) medium, which is typically used for Lactobacilli, contains peptone, meat extract, yeast extract, potassium phosphate, ammonium citrate dibasic, sodium acetate, magnesium sulfate, manganese sulfate, and a surfactant. The M17 medium, which is typically used for Lactococci, contains trypton, soy peptone, lab-recom powder, yeast extract, ascorbic acid, magnesium sulfate, and disodium glycerophosphate. Therefore, the lactic acid fermentation liquor is a mixed solution containing lactic acid and many other solutes, and is usually colored from yellowish to brownish. The concentration of lactic acid in the lactic acid fermentation liquor may be usually about 10 to 150 g/L.

For the production of a branched polylactic acid constituting the additive of the present invention, the lactic acid fermentation liquor may be directly used or may be used after removing bacterial cells in advance. Since bacterial cells are insoluble in water, in order to remove bacterial cells, a lactic acid fermentation liquor may be left to stand still and then the supernatant be collected. Alternatively, bacterial cells may be removed by centrifugation or filtration.

For the production of a branched polylactic acid constituting the additive of the present invention, an initiator hydroxylated fat and oil, epoxidized fat and oil, polyether polyol, nucleoside, or sugar alcohol may be added to a lactic acid fermentation liquor and be subjected to dehydrative polycondensation, and the resultant oil may be collected to obtain a branched polylactic acid constituting the additive of the present invention can be obtained. Since a branched polylactic acid constituting the additive of the present invention is insoluble in water while other components contained in the fermentation liquor are soluble in water, it is possible to readily take the resultant branched polylactic acid by collecting the oil.

Moreover, when said other components contained in the lactic acid fermentation liquor are solid at ordinary temperatures, those components precipitate and solidify on the bottom and the wall of the reaction vessel during the process of dehydrative polycondensation process. Therefore, after the dehydrative polycondensation, water may be added to dissolve such solids in water and separate from the oil.

(Polylactic Acid)

In the polylactic acid resin composition of the present invention, a polylactic acid used together with the above-described branched polylactic acid is a polymer having L-lactic acid and/or D-lactic acid as primary constituent(s).

According to the present invention, to obtain a resin composition having particularly great heat resistance, it is preferable to use a polylactic acid resin that contains a constituent lactic acid (L-isomer or D-isomer) having a high optical purity. It is preferable that 80% or greater of the total constituent lactic acid of the polylactic acid resin is the L-isomer or the D-isomer, it is particularly preferable that 90% or greater is the L-isomer or the D-isomer, and it is still more preferable that 95% or greater is the L-isomer or the D-isomer.

The polylactic acid for use in the polylactic acid resin composition of the present invention may contain another monomeric unit that is not derived from L-lactic acid or D-lactic acid. For example, other hydroxycarboxylic acids may be contained. Examples of those other hydroxycarboxylic acids include difunctional aliphatic hydroxycarboxylic acids such as glycolic acid, 3-hydroxybutyric acid, 4-hydroxybutyric acid, 2-hydroxy-n-butyric acid, 2-hydroxy-3,3-dimethylbutyric acid, 2-hydroxy-3-methylbutyric acid, 2-methylbutyric acid, 2-hydroxycaproic acid, and the like; lactones such as caprolactone, butyrolactone, valerolactone, and the like; and the like.

Examples of other monomeric units include glycolic compounds such as ethylene glycol, propylene glycol, butanediol, heptanediol, hexanediol, octanediol, nonanediol, decanediol, 1,4-cyclohexanedimethanol, neopentyl glycol, glycerol, pentaerythritol, bisphenol A, polyethylene glycol, polypropylene glycol, polytetramethylene glycol, and the like; dicarboxylic acids such as oxalic acid, adipic acid, sebacic acid, azelaic acid, dodecanedioic acid, malonic acid, glutaric acid, cyclohexanedicarboxylic acid, terephthalic acid, isophthalic acid, phthalic acid, naphthalene dicarboxylic acid, bis(p-carboxyphenyl)methane, anthracenedicarboxylic acid, diphenyl ether 4,4'-dicarboxylic acid, 5-sodiumsulfoisophtharic acid, 5-tetrabuthylphosphoniumisophthalic acid, and the like. However, the monomeric units are not limited to those listed above insofar as monomeric units can be incorporated into the skeleton of polyester (i.e., polylactic acid) by a polycondensation reaction.

The amount of those other monomers preferably accounts for 0 to 30 mol % and more preferably 0 to 10 mol % of the entire monomeric components.

A polylactic acid for use in the polylactic acid resin composition of the present invention may be produced according to a known method. Usable polymerization methods for the polylactic acid may be condensation polymerization, ring-opening polymerization, and other known polymerization methods. For example, in condensation polymerization, L-lactic acid or D-lactic acid, or a mixture thereof can be directly subjected to dehydrative polycondensation to obtain a polylactic acid of any make-up. In ring-opening polymerization, a polylactic acid can be obtained from lactide, which is a cyclic dimer of lactic acid, as a polymerization modifier or the like as needed, using a selected catalyst. Lactides include L-lactide, which is a dimer of L-lactic acid, D-lactide, which is a dimer of D-lactic acid, and DL-lactide, which is composed of L-lactic acid and D-lactic acid, which may be properly blended and polymerized a polylactic acid having any make-up and crystallizability.

The molecular weight of a polylactic acid used in the present invention is not limited insofar as the polylactic acid resin composition demonstrates substantially sufficient mechanical properties for the intended use, e.g., when processed into an injection-molded article. A lower molecular weight causes decrease in the strength of the molded article and increase in the rate of decomposition. On the other hand, a higher molecular weight causes lowering of the processability, making it difficult to perform molding. The polylactic acid used in the present invention preferably has a range of the weight-average molecular weight of 50000 to 400000 and more preferably 100000 to 250000.

For a polylactic acid used in the polylactic acid resin composition of the present invention, known commercially available products may be usable, and examples include Lacea (trade name) manufactured by Mitsui Chemicals, Inc., Eco Plastic (U'z) (trade name) manufactured by Toyota Motor Corporation, Nature Works (trade name) manufactured by Cargill Dow Polymer LLC, and the like.

(Polylactic Acid Resin Composition)

The polylactic acid resin composition of the present invention is characterized by that in which a branched polylactic acid as described above, which has at least three branched chains composed of a polylactic acid in the molecule, is blended with a polylactic acid as described above.

The proportion of the additive composed of the branched polylactic acid in the polylactic acid resin composition of the present invention is preferably 1 to 30 parts by weight and more preferably 10 to 30 parts by weight per 100 parts by weight of the polylactic acid.

The polylactic acid resin composition of the present invention can be produced by, for example, melt-blending the polylactic acid and the additive. The polylactic acid is heated to the melting point or higher to melt, the additive is added and blended by a means such as stirring or kneading, and then be cooled, to give a polylactic acid resin composition. Kneading can be performed with shearing force-applied distribution, and using a kneader, a revolving roller, an extruder, or the like so as to achieve a good blending.

Also, the polylactic acid and the additive may be roughly blended in advance and then melt-blended.

It is preferable that melt blending is carried out at a temperature higher than the melting point of the polylactic acid and 250° C. or lower. A temperature exceeding 250° C. causes depolymerization of polylactic acid, thus lowering the molecular weight and deteriorating physical properties.

Upon melt blending, it is preferable that the polylactic acid is sufficiently dried in advance to remove moisture and then perform kneading. If water is present, the polylactic acid and the branched polylactic acid may hydrolyze and deteriorate with heating.

The polylactic acid resin composition of the present invention is obtained by that 0.1 to 5 parts by weight and preferably 0.5 to 3 parts by weight of talc or mica is further melt-blended therein.

The polylactic acid resin composition of the present invention is obtained by which 0.1 to 5 parts by weight and preferably 0.5 to 3 parts by weight of polyethylene glycol or polypropylene glycol is further melt-blended therein.

The polylactic acid resin composition of the present invention is obtained by which 1 to 30 parts by weight and preferably 5 to 20 parts by weight of at least one selected from the group consisting of diethylene glycol diacetate, ethylene glycol dibenzoate, diethylene glycol dibutyl ether, diethylene glycol diethyl ether, diethylene glycol dimethyl ether, monoolein, triacetin, tributyrin, triethylene glycol diacetate, triethylene glycol dimethyl ether, acetyl tributyl citrate, acetyl triethyl citrate, methyl acetyl ricinolate, adipic acid diesters, fumaric acid diesters, maleic acid diesters, and sebacic acid diesters is further melt-blended therein.

Also, the polylactic acid resin composition of the present invention can be produced by dissolving and blending the polylactic acid and the additive using a solvent.

Examples of solvents include chloroform, methylene chloride, dioxane, and the like. The polylactic acid and the additive can be dissolved in these solvents at room temperature.

The polylactic acid and the additive can be dissolved in xylene, ethylbenzene, mesitylene, and like solvents also under heating.

For example, the polylactic acid resin composition can be produced by dissolving the polylactic acid and the additive in chloroform and then evaporating chloroform away.

In the polylactic acid resin composition of the present invention, the additive is added to the polylactic acid. The additive branched polylactic acid acts to shield crystallization of the molecular chains of the polylactic acid and broaden space between the molecular chains to facilitate molecular motion, thereby enhancing the flexibility of polylactic acid. Therefore, the polylactic acid resin composition of the present invention has excellent flexibility. The elongation at break of polylactic acid is significantly increased by the addition of the branched polylactic acid. That is, the toughness, especially the toughness against low-speed deformation, of polylactic acid is greatly improved. Thus, according to the polylactic acid resin composition of the present invention, plasticity can be provided with a conventional polylactic acid. Since the branched polylactic acid is noncrystallizable while a relatively high molecule, the branched polylactic acid can be added without increasing crystallinity, thereby preventing a bleed-out. Such a blend results in compatibility at a molecular level, leading to a stable compatibility to prevent a bleed-out. Further, the polylactic acid and the branched polylactic acid have small crystal size and similar refractive index due to their similar structures, it is thus possible to provide a transparent resin composition.

It can be confirmed that the polylactic acid resin composition of the present invention is more plastic than the polylactic acid, by comparing their mechanical properties. Polylactic acid is a very hard resin and breaks at a strain of about 20% when singly subjected to a uniaxial elongation test. In contrast, the polylactic acid resin composition of the present invention is observed to exhibit a breaking strain of 100% to 700%. Accordingly, the plasticization of polylactic acid can be facilitated by blending a polylactic acid and a branched polylactic acid of which the molecular structures are different.

The polylactic acid resin composition of the present invention may be obtained in a molten state or in a lump form. By further subjecting the polylactic acid resin composition of the present invention to a granulation operation, it may be processed into particles. Examples of granulated forms include granular, pellet, tablet, and like forms. The granulation operation may be performed using any procedure and device commonly employed by a person skilled in the art. For example, the polylactic acid is melted while the additive is injected thereinto for melt-kneading and the resultant blend is extruded in a strand form using a twin-screw extruder or the like, and then cooled, and subsequently processed into pellets with a pelletizer. Pellets thus prepared may be sufficiently dried to remove moisture, and then subjected to injection molding or the like.

Also, in order to obtain the polylactic acid resin composition, only the additives such as a branched polylactic acid may be processing into a granulated form by a granulation operation, and then be blended with the polylactic acid before molding. The polylactic acid resin composition may be obtained by dry-blending polylactic acid pellets and additive pellets using a mixer, a hand mixing, or the like. The dry-blended granulates may be directly processed into the hopper of a molding machine for molding.

(Processing and Use of Polylactic Acid Resin Composition)

The polylactic acid resin composition of the present invention can be molded employing any currently known molding method such as injection molding, gas-assist molding, injection compression molding, extrusion molding, blow molding, press molding, and vacuum/pressure molding. In addition to the aforementioned methods, in-molding, gas press molding, two-color molding, sandwich molding, and push-pull molding can be employed. As for the molding conditions, to avoid the thermal decomposition of the resin in an injection cylinder, it is preferable to perform molding at a molten resin temperature in a range of 170 to 250° C.

Polylactic acid has a main chain of quite rigid as it is clear from a relatively high glass transition temperature of 57 to 60° C., and has a lower rate of crystallization than that of polyethylene terephthalate resins which are generally considered as having a low rate of crystallization. Therefore, in injection molding that does not involve any extension operation, polylactic acid is still in a semi molten state even when the temperature of a mold is set to 90 to 100° C. (high-temperature mold), which is an optimal temperature for crystallization. When the temperature of mold is set to near room temperature (low-temperature mold), polylactic acid is cooled and solidified, however, the resulting product has a very low degree of crystallization and poor heat resistance.

Although polylactic acid is a crystallizable polymer and essentially has sufficient crystallizing potential, the crystallization hardly proceeds when polylactic acid is molded under the conditions where various polymeric materials such as commodity-grade resins are generally molded (for example, a mold temperature of 50° C.). Generally, even when the temperature of mold is set to be lower, polylactic acid is solidified in a noncrystalline (amorphous) state to give a molded article. Although a molded article solidified in an amorphous state has excellent transparency, there are problems in such a molded article of difficulty in use due to deformation in applications to hot-film (e.g., for hot drinks), deformation on exposed to high temperatures outdoor or in a delivery track in summer, and so on. The heat resistance, specifically the heat deformation temperature, of a molded article of polylactic acid in an amorphous state is 50 to 60° C., which is associated with the glass transition temperature of polylactic acid. However, regarding the heat resistance for containers for use in high temperatures, housings for household electric appliances, and automobile materials, it is required to be 100° C. or higher.

In contrast, the polylactic acid resin composition of the present invention exhibits a high degree of crystallization even in a low-temperature mold and greater heat resistance than conventional polylactic acid. Therefore, it is not necessary to spend much time for crystallization (cooling), thereby shortening the molding cycle and enhancing productivity.

It can be confirmed that the polylactic acid resin composition of the present invention has a more enhanced than crystallization polylactic acid, by comparing their thermal properties. The crystallization enthalpy was measured with a differential scanning calorimeter (DSC) when thermally melted at 200° C., kept for 10 minutes, and then cooled to 20° C. at a rate of 100° C./min. As a result, while almost no heat release from crystallization has been observed for the polylactic acid, the polylactic acid resin composition of the present invention has exhibited a heat of crystallization of 20 to 60 J/g. Polylactic acid is highly unlikely to crystallize although it is a crystallizable polymer. In contrast, the polylactic acid resin composition of the present invention is highly likely to crystallize and has an enhanced heat resistance due to the increased crystallizability.

The polylactic acid resin composition of the present invention may be crystallized according to any suitable method during or after molding to further increase the degree of crystallization. For example, in order to enhance the crystallizability, a melt material of the composition can be filled into a mold on molding and crystallized directly in a high-temperature mold, or a molded noncrystallizable article of the composition can be subjected to dry heating or moist heating.

The polylactic acid resin composition of the present invention can be melt-kneaded and thus can be processed and used into various molded articles according to methods such as injection molding and extrusion molding. Usable molded articles include injection-molded articles, extrusion-molded articles, blow-molded articles, films including non-oriented films, uniaxially oriented films, biaxially oriented films, blown films, and like various films, fibers including non-drawn yarns, drawn yarns, super-drawn yarns, and like various fibers, sheets, and the like. Such articles can be used in various applications including electric and electronic components, building components, automobile parts, articles of daily use, and the like.

To produce a molded article from the polylactic acid resin composition of the present invention, a polylactic acid and the additive of the present invention, and optional ingredients as needed may be blended according to either wet blending or dry blending.

In wet blending, the ingredients are blended in a molten state. A polylactic acid is heated to the melting point or higher to be melted, and then to the melted polylactic acid, the additive of the present invention as well as optional ingredients as needed are blended to give the polylactic acid composition of the present invention. For example, a polylactic acid, the additive of the present invention, and optional ingredients are blended at applying a shearing force with a kneader, a twin screw kneader/extruder, or a like apparatus while heating. At this time, the polylactic acid is in a molten state, but the additive of the present invention and optional ingredients are not necessarily in a liquid form and may be solid. By further subjecting the polylactic acid resin composition of the present invention to a granulation operation after wet blending, it may be processed into a granulated form. Examples of the granulated forms include granular, pellet, tablet, and like forms. The granulation operation may be performed using any procedure and device commonly employed by a person skilled in the art. For example, the polylactic acid is melted while the additive is injected thereinto for melt-kneading and the resultant blend is extruded in a strand form using a twin-screw extruder or the like, and then cooled, and subsequently processed into pellets with a pelletizer. Pellets thus prepared may be sufficiently dried to remove moisture, and then subjected to injection molding or the like.

In dry blending, the ingredients are blended in a solid state without melting. In order to obtain the polylactic acid resin composition, only the additive of the present invention and optional ingredients may be processed into a granulated form by a granulation operation, and then blended with the polylactic acid in a solid state before molding. The polylactic acid resin composition may be obtained by dry-blending polylactic acid pellets and additive pellets using a mixer, a hand mixing, or the like. The dry-blended granulates can be directly introduced into the hopper of a molding machine for molding. The operation to process only the additive of the present invention and optional ingredients into particles may be performed using any procedure and device commonly employed by a person skilled in the art. For example, the additive of the present invention is melted while optional ingredients are injected thereinto for melt-kneading and the resultant blend is extruded in a strand form using a twin-screw extruder or the like, and then cooled, and subsequently processed into pellets with a pelletizer. Using dry blending, the additive can be added while controlling the amount at the site of molding.

Furthermore, in order to obtain the polylactic acid resin composition, a polylactic acid composition containing the additive of the present invention and optional ingredients in higher concentrations may be produced by wet blending, and then processed into a granulated form by a granulation operation, and subsequently blended with a polylactic acid by dry-blending before molding. While a preferable amount of the additive of the present invention blended is 1 to 30 parts by weight per 100 parts by weight of a polylactic acid, for example, 90 parts by weight of the additive is blended with 100 parts by weight of a polylactic acid to give a polylactic acid composition containing the additive of the present invention in a higher concentration (masterbatch), and a polylactic acid is blended with the masterbatch by dry-blending so as to obtain a polylactic acid composition containing the additive in a preferable proportion. Using this combination of wet blending and dry blending, the additive can be added while controlling the amount at the site of molding, and be readily blended since the additive of the present invention is blended in advance with polylactic acid by application of a shearing force.

Moreover, in the method in which the additive of the present invention and optional ingredients are melt-blended, processed into a granulated form by a granulation operation, and dry-blended with a polylactic acid before molding in order to obtain a polylactic acid resin composition, the optional ingredients are more often in contact with the additive of the present invention than in wet blending in which the polylactic acid also is melt-blended, thereby allowing the optional ingredients to preferentially contribute to the additive of the present invention. For example, the additive of the present invention is wet-blended with an optional ingredient that may be added as needed such as a clay mineral such as talc or mica, an organometallic compound such as a phthalate (e.g., sodium phthalate), or the like, which serves as a crystal nucleus for the additive of the present invention according to a wet-blend process, and then dry-blended with a polylactic acid before molding. Accordingly, the material which serves as crystal nucleus, in a molten state upon molding, can be in contact with the additive more often than a polylactic acid and act on the additive more preferentially than a polylactic acid, thereby further facilitating the crystallization of the additive by the material which serves as crystal nucleus, and the crystallization of polylactic acid by the more crystallized additive, and as a result, a polylactic acid with a higher degree of crystallization, i.e., greater heat resistance, can be obtained. In this manner, the crystallization inducing effect of the additive of the present invention can be facilitated.

For resin molding, the additive of the present invention in a powder or granulated form may be blended with a polylactic acid and optional ingredients by melt blending or a like technique to produce a polylactic acid resin composition in a granulated form, and the composition may be introduced into the hopper of a molding machine, thermally melted in a cylinder, extruded through a nozzle, and filled into a mold.

EXAMPLES

The present invention will now be described in more detail below by way of examples. However, the scope of the invention is not limited to these examples.

Example 1

100 parts by weight of L-lactide (manufactured by Musashino Chemical Laboratory, Ltd.) and 43 parts by weight of initiator polypropylene glycol (manufactured by Wako Pure Chemical Industries, Ltd., trifunctional, a molecular weight of 3000) were mixed, and 1 part by weight of tin 2-ethylhexanoate was added as a catalyst. This mixture was heated under an argon atmosphere at 130° C. for 20 hours to give a polymer. The resulting polymer was subjected to $^1$H-NMR spectroscopy to determine the structure. As a result, the peaks derived from methines located adjacent to the hydroxy groups of polypropylene glycol disappeared, thus confirming that a star-branched polylactic acid starting from the hydroxy groups of polypropylene glycol was synthesized. The molecular weight of the resulting branched polylactic acid was determined using gel permeation chromatography (GPC), and it was found that the number-average molecular weight was 10000. The molecular weight determined by GPC was conformed well to the molecular weight calculated based on the ratio of the starting materials, thereby establishing that no polylactic acid homopolymer was generated and only branched polylactic acid for which polypropylene glycol served as an initiator was obtained.

5 parts by weight of this branched polylactic acid and 95 parts by weight of polylactic acid (a weight-average molecular weight of 170000) were dissolved in chloroform and blended. The resultant blend was dried to give a polylactic acid resin composition in a sheet form. This composition was transparent. This composition was subjected to a uniaxial elongation test and exhibited an elongation at break of 150%.

Example 2

A polylactic acid resin composition in a sheet form was obtained in the same manner as in Example 1 except that polypropylene glycol having a molecular weight of 1500 (manufactured by Wako Pure Chemical Industries, Ltd.) was used in place of polypropylene glycol having a molecular weight of 3000. This composition was also transparent. This composition was subjected to a uniaxial elongation test and exhibited an elongation at break of 120%.

Example 3

A polylactic acid resin composition in a sheet form was obtained in the same manner as in Example 1 except that polyethylene glycol (manufactured by Wako Pure Chemical Industries, Ltd., trifunctional, a molecular weight of 1500) was used in place of polypropylene glycol. This composition was also transparent. This composition was subjected to a uniaxial elongation test and exhibited an elongation at break of 110%.

Example 4

A polylactic acid resin composition in a sheet form was obtained in the same manner as in Example 1 except that glycerol (manufactured by Wako Pure Chemical Industries, Ltd.) was used in place of polypropylene glycol. This composition was also transparent. This composition was subjected to a uniaxial elongation test and exhibited an elongation at break of 100%.

Comparative Example 1

Polylactic acid (a weight-average molecular weight of 150000) was dissolved in chloroform and dried to give a polylactic acid resin composition in a sheet form. This composition was transparent. This composition was subjected to a uniaxial elongation test and exhibited an elongation at break of only 20%.

Example 5

100 parts by weight of L-lactide (manufactured by Musashino Chemical Laboratory, Ltd.) and 43 parts by weight of initiator adenosine (manufactured by Wako Pure Chemical Industries, Ltd.) were mixed, and 1 part by weight of tin 2-ethylhexanoate was added as a catalyst. This mixture was heated under an argon atmosphere at 130° C. for 20 hours to give a polymer. Since the resulting polymer was colored slightly yellow, the polymer was dissolved in chloroform, large amounts of ethanol was added dropwise to the solution to give a precipitate, and the precipitate was recovered by filtration and dried to give a purified polymer. This purified polymer was subjected to $^1$H-NMR spectroscopy to determine the structure. As a result, the peaks derived from methines located adjacent to the hydroxy groups of adenosine disappeared, thus confirming that a star-branched polylactic acid starting from the hydroxy groups of adenosine was synthesized. The molecular weight of the resulting branched polylactic acid was determined using gel permeation chromatography (GPC), and it was found that the number-average molecular weight was 10000. The molecular weight determined by GPC was conformed well to the molecular weight calculated based on the ratio of the starting materials, thereby establishing that no polylactic acid homopolymer was generated and only branched polylactic acid for which adenosine served as an initiator was obtained.

5 parts by weight of this branched polylactic acid and 95 parts by weight of polylactic acid (a weight average molecular weight of 170000) were dissolved in chloroform and blended. The resultant blend was dried to give a polylactic acid resin composition in a sheet form. This composition was transparent. This composition was subjected to a uniaxial elongation test and exhibited an elongation at break of 110%.

Example 6

A polylactic acid resin composition in a sheet form was obtained in the same manner as in Example 1 except that DL-lactide (manufactured by Musashino Chemical Laboratory, Ltd., Inc.) was used in place of L-lactide. This composition was also transparent. This composition was subjected to a uniaxial elongation test and exhibited an elongation at break of 180%.

Example 7

90 parts by weight of dehydrated lactic acid obtained by heating 100 parts by weight of L-lactic acid (manufactured by Wako Pure Chemical Industries, Ltd., 90 v/v % aqueous solution) under reduced pressure and 0.8 parts by weight of initiator glycerol (manufactured by Wako Pure Chemical Industries, Ltd.) were mixed, and 1 part by weight of tin 2-ethylhexanoate was added as a catalyst. This mixture was heated to 150° C. under a nitrogen atmosphere with thoroughly stirred, kept at atmospheric pressure for 5 hours, at a reduced pressure of 13000 Pa for 2 hours, at a reduced pressure of 4000 Pa for 2 hours and a reduced pressure of 2600 Pa for 2 hours, and then heated to 180° C. and kept at a reduced pressure of 1300 Pa for 2 hours to give a polymer. The molecular weight of the resulting polymer was determined using gel permeation chromatography (GPC), and it was found that the number-average molecular weight was 10000. The molecular weight determined by GPC was conformed well to the molecular weight calculated based on the ratio of the starting materials, thereby establishing that no polylactic acid homopolymer was generated and only branched polylactic acid for which glycerol served as an initiator was obtained.

10 parts by weight of this branched polylactic acid and 90 parts by weight of polylactic acid (a weight-average molecular weight of 170000) were dissolved in chloroform and blended. This mixture was dried to give a polylactic acid resin composition in a sheet form. This composition was transparent. This composition was subjected to a uniaxial elongation test and exhibited an elongation at break of 160%.

Example 8

100 parts by weight of L-lactide (manufactured by Musashino Chemical Laboratory, Ltd.) and 43 parts by weight of initiator polypropylene glycol (manufactured by Wako Pure Chemical Industries, Ltd., trifunctional, a molecular weight of 3000) were mixed, and 1 part by weight of tin 2-ethylhexanoate was added as a catalyst. This mixture was heated under an argon atmosphere at 130° C. for 20 hours to give a polymer. The resulting polymer was subjected to $^1$H-NMR spectroscopy to determine the structure. As a result, the peaks derived from methines located adjacent to the hydroxy groups of polypropylene glycol disappeared, thus confirming that a star-branched polylactic acid starting from the hydroxy groups of polypropylene glycol was synthesized. The molecular weight of the resulting branched polylactic acid was determined using gel permeation chromatography (GPC), and it was found that the number-average molecular weight was 10000. The molecular weight determined by GPC was conformed well to the molecular weight calculated based on the ratio of the starting materials, thereby establishing that no polylactic acid homopolymer was generated and only branched polylactic acid for which polypropylene glycol served as an initiator was obtained.

Next, phthalic anhydride dissolved in pyridine was added to this branched polylactic acid and heated at 95° C. for 2 hours. The resulting pyridine solution was neutralized with aqueous sodium hydroxide. White deposits precipitated by neutralization were separated and collected by centrifugation and then washed with water to give a branched polylactic acid in which the hydrogen in a terminal hydroxy group was substituted with an acyl group derived from sodium phthalate.

20 parts by weight of this branched polylactic acid and 80 parts by weight of polylactic acid (a weight-average molecular weight of 100000) were melt-blended at 180° C. using a batch-type melt-kneading machine (manufactured by Toyo Seiki Seisaku-sho, Ltd., Labo Plastomill) to give a polylactic acid resin composition in a lump form. This composition was thermally melted at 200° C., kept for 5 minutes, and cooled to 20° C. at a rate of 100° C./min using a differential scanning calorimeter (DSC), and then the heat of crystallization was measured to be 23 J/g. This is the heat released due to the crystallization of polylactic acid. Also, the composition was cooled to −100° C. and heated again to 200° C. at a rate of 10° C./min, and then the heat of crystal fusion was measured to be 43 J/g. As can be understood from the ratio of the heat of crystallization to the heat of crystal fusion, crystallization proceeded by 53% during the course of rapid cooling.

Example 9

A polylactic acid resin composition in a lump form was obtained in the same manner as in Example 8 except that glycerol (manufactured by Wako Pure Chemical Industries, Ltd.) was used in place of polypropylene glycol. This composition was thermally melted at 200° C., kept for 5 minutes, and cooled to 20° C. at a rate of 100° C./min using DSC, and then the heat of crystallization was measured to be 35 J/g. This is the heat released due to the crystallization of polylactic acid. Also, the composition was cooled to −100° C. and heated again to 200° C. at a rate of 10° C./min, and then the heat of crystal fusion was measured to be 42 J/g. As can be understood from the ratio of the heat of crystallization to the heat of crystal fusion, crystallization proceeded by 83% during the course of rapid cooling.

Example 10

A polylactic acid resin composition in a lump form was obtained in the same manner as in Example 8 except that guanosine (manufactured by Wako Pure Chemical Industries, Ltd.) was used in place of polypropylene glycol. This composition was thermally melted at 200° C., kept for 5 minutes, and cooled to 20° C. at a rate of 100° C./min using DSC, and then the heat of crystallization was measured to be 30 J/g. This is the heat released due to the crystallization of polylactic acid. Also, the composition was cooled to −100° C. and heated again to 200° C. at a rate of 10° C./min, and then the heat of crystal fusion was measured to be 42 J/g. As can be understood from the ratio of the heat of crystallization to the heat of crystal fusion, crystallization proceeded by 71% during the course of rapid cooling.

Comparative Example 2

Polylactic acid (a weight-average molecular weight of 100000) was thermally melted at 200° C., kept for 5 minutes, and cooled to 20° C. at a rate of 100° C./min using DSC, and then the heat of crystallization was measured to be 0.2 J/g.

This is the heat released due to the crystallization of polylactic acid. Also, polylactic acid was cooled to −100° C. and heated again to 200° C. at a rate of 10° C./min, and then the heat of crystal fusion was measured to be 43 J/g. As can be understood from the ratio of the heat of crystallization to the heat of crystal fusion, crystallization proceeded by only 0.5% during the course of rapid cooling. This shows that crystallization hardly proceeds in homogeneous nucleation by polylactic acid alone.

Example 11

90 parts by weight of dehydrated lactic acid obtained by heating 100 parts by weight of L-lactic acid (manufactured by Wako Pure Chemical Industries, Ltd., 90 v/v % aqueous solution) under reduced pressure and 9.1 parts by weight of initiator castor oil (manufactured by Wako Pure Chemical Industries, Ltd.) were mixed, and 1 part by weight of tin 2-ethylhexanoate was added as a catalyst. This mixture was heated to 150° C. under a nitrogen atmosphere with thoroughly stirred, kept at atmospheric pressure for 5 hours, at a reduced pressure of 13000 Pa for 2 hours, at a reduced pressure of 4000 Pa for 2 hours and a reduced pressure of 2600 Pa for 2 hours, and then heated to 180° C. and kept at a reduced pressure of 1300 Pa for 2 hours to give a polymer. The molecular weight of the resulting polymer was determined using gel permeation chromatography (GPC), and it was found that the number-average molecular weight was 8000. The molecular weight determined by GPC was conformed well to the molecular weight calculated based on the ratio of the starting materials, thereby establishing that no polylactic acid homopolymer was generated and only branched polylactic acid for which castor oil served as an initiator was obtained.

Next, to this branched polylactic acid, phthalic anhydride dissolved in pyridine was added and heated at 98° C. for 2 hours. The resulting pyridine solution was neutralized with aqueous sodium hydroxide. White deposits precipitated by neutralization were separated and collected by centrifugation and then washed with water to give a branched polylactic acid in which the hydrogen in a terminal hydroxy group was substituted with an acyl group derived from sodium phthalate.

The molecular weight of the resulting branched polylactic acid was determined using GPC, and it was found that the number-average molecular weight was 9000, the molecular weight distribution (Mw/Mn) was 1.6, and the branched polylactic acid molecule having a molecular weight of 3000 or less accounted for no more than 1%. The melting point of the resulting branched polylactic acid was 130° C.

This branched polylactic acid was thermally melted at 200° C., kept for 5 minutes, and cooled to 20° C. at a rate of 100° C./min using DSC, and then a heat of crystallization of 31 J/g was measured at 115° C. Since this heat release was due to crystallization, it can be understood that the branched polylactic acid with the substitution of the terminal hydroxy group was a highly crystallizable polymer.

20 parts by weight of this branched polylactic acid and 80 parts by weight of polylactic acid (a weight-average molecular weight of 100000) were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 42 J/g. This is the heat released due to the crystallization of polylactic acid. Also, the composition was cooled to −100° C. and heated again to 200° C. at a rate of 10° C./min, and then the heat of crystal fusion was measured to be 43 J/g. As can be understood from the ratio of the heat of crystallization to the heat of crystal fusion, crystallization proceeded by 98% during the course of rapid cooling.

During the course of cooling of the polylactic acid resin composition, a crystal nucleus of the branched polylactic acid is generated first and a crystal growth proceeds. Then, a crystal nucleus of the polylactic acid is generated, and a crystal growth proceeds so as to be in conformity with the crystal growth of the branched polylactic acid. Such epitaxial crystal growth facilitates crystallization. The essence of the mechanism of action of the nucleating agent is epitaxy, and the matching of the crystal lattice constant of the surface of the nucleating agent with the crystal lattice constant of the base resin determines the basic capabilities as a nucleating agent. Therefore, it is important to design a nucleating agent that has on its surface a crystal structure close to the crystal structure of polylactic acid. Since the additive of branched polylactic acid according to the present invention has the same monomer as the base resin polylactic acid, the additive is believed to be suitable as a nucleating agent to be added to polylactic acid.

Example 12

A branched polylactic acid in which the hydrogen in a terminal hydroxyl group was substituted with an acyl group derived from sodium phthalate was produced in the same manner as in Example 11 except that 3.4 parts by weight of castor oil was used in place of 9.1 parts by weight of castor oil.

The molecular weight of the resulting branched polylactic acid was determined using GPC, and it was found that the number-average molecular weight was 19000, the molecular weight distribution (Mw/Mn) was 1.7, and the branched polylactic acid molecule having a molecular weight of 3000 or less accounted for no more than 1%. The melting point of the resulting branched polylactic acid was 150° C. This branched polylactic acid was thermally melted at 200° C., kept for 5 minutes, and cooled to 20° C. at a rate of 100° C./min using DSC, and then a heat of crystallization of 40 J/g was measured at 117° C. Since this heat release was due to crystallization, it can be understood that the branched polylactic acid with the substitution of the terminal hydroxy group was a highly crystallizable polymer.

20 parts by weight of this branched polylactic acid and 80 parts by weight of polylactic acid (a weight-average molecular weight of 100000) were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 43 J/g. This is the heat released due to the crystallization of polylactic acid. Also, the composition was cooled to −100° C. and heated again to 200° C. at a rate of 10° C./min, and then the heat of crystal fusion was measured to be 43 J/g. As can be understood from the ratio of the heat of crystallization to the heat of crystal fusion, crystallization proceeded by 100% during the course of rapid cooling.

Example 13

100 parts by weight of L-lactide (manufactured by Musashino Chemical Laboratory Ltd.) and 25 parts by weight of initiator castor oil (manufactured by Itoh Oil Chemicals Co., Ltd.) were mixed, and 1 part by weight of tin 2-ethylhexanoate was added as a catalyst. This mixture was heated under a nitrogen atmosphere at 130° C. for 20 hours to give a polymer. The resulting polymer was subjected to $^1$H-NMR spectroscopy to determine the structure. As a result, the peaks derived from methines located adjacent to the hydroxy groups of castor oil disappeared, thus confirming that a star-branched polylactic acid starting from the hydroxy groups of castor oil was synthesized.

Next, to this branched polylactic acid, phthalic anhydride dissolved in pyridine was added and heated at 98° C. for 2 hours. The resulting pyridine solution was neutralized with aqueous sodium hydroxide. White deposits precipitated by neutralization were separated and collected by centrifugation and then washed with water to give a branched polylactic acid in which the hydrogen in a terminal hydroxy group was substituted with an acyl group derived from sodium phthalate.

The molecular weight of the resulting branched polylactic acid was determined using GPC, and it was found that the number-average molecular weight was 4000, the molecular weight distribution (Mw/Mn) was 1.1, and the branched polylactic acid molecule having a molecular weight of 3000 or less accounted for 8%. The melting point of the resulting branched polylactic acid was 120° C. This branched polylactic acid was thermally melted at 200° C., kept for 5 minutes, and cooled to 20° C. at a rate of 100° C./min using DSC, and then a heat of crystallization of 23 J/g was measured at 100° C. Since this heat release was due to crystallization, it can be understood that the branched polylactic acid with the substitution of the terminal hydroxy group was a highly crystallizable polymer.

20 parts by weight of this branched polylactic acid and 80 parts by weight of polylactic acid (a weight-average molecular weight of 100000) were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 30 J/g. This is the heat released due to the crystallization of polylactic acid. Also, the composition was cooled to −100° C. and heated again to 200° C. at a rate of 10° C./min, and then the heat of crystal fusion was measured to be 41 J/g. As can be understood from the ratio of the heat of crystallization to the heat of crystal fusion, crystallization proceeded by 73% during the course of rapid cooling.

Example 14

A branched polylactic acid in which the hydrogen in a terminal hydroxyl group was substituted with an acyl group derived from sodium phthalate was produced in the same manner as in Example 13 except that 2.6 parts by weight of castor oil was used in place of 25 parts by weight of castor oil.

The molecular weight of the resulting branched polylactic acid was determined using GPC, and it was found that the number-average molecular weight was 40000, the molecular weight distribution (Mw/Mn) was 1.9, and the branched polylactic acid molecule having a molecular weight of 3000 or less accounted for no more than 1%. The melting point of the resulting branched polylactic acid was 160° C. This branched polylactic acid was thermally melted at 200° C., kept for 5 minutes, and cooled to 20° C. at a rate of 100° C./min using DSC, and then a heat of crystallization of 26 J/g was measured at 108° C. Since this heat release was due to crystallization, it can be understood that the branched polylactic acid with the substitution of the terminal hydroxy group was a highly crystallizable polymer.

20 parts by weight of this branched polylactic acid and 80 parts by weight of polylactic acid (a weight-average molecular weight of 100000) were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 34 J/g. This is the heat released due to the crystallization of polylactic acid. Also, the composition was cooled to −100° C. and heated again to 200° C. at a rate of 10° C./min, and then the heat of crystal fusion was measured to be 42 J/g. As can be understood from the ratio of the heat of crystallization to the heat of crystal fusion, crystallization proceeded by 81% during the course of rapid cooling.

Example 15

A branched polylactic acid in which the hydrogen in a terminal hydroxyl group was substituted with an acyl group derived from sodium phthalate was produced in the same manner as in Example 13 except that 2 parts by weight of castor oil was used in place of 25 parts by weight of castor oil.

The molecular weight of the resulting branched polylactic acid was determined using GPC, and it was found that the number-average molecular weight was 45000, the molecular weight distribution (Mw/Mn) was 2, and the branched polylactic acid molecule having a molecular weight of 3000 or less accounted for no more than 1%. The melting point of the resulting branched polylactic acid was 164° C. This branched polylactic acid was thermally melted at 200° C., kept for 5 minutes, and cooled to 20° C. at a rate of 100° C./min using DSC, and then a heat of crystallization of 14 J/g was measured at 101° C. It can be understood that although this heat release was due to crystallization, the increase of the molecular weight of the branched polylactic acid exhibited the properties as a linear polylactic acid significantly and resulted in poor crystallizability.

20 parts by weight of this branched polylactic acid and 80 parts by weight of polylactic acid (a weight-average molecular weight of 100000) were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 6 J/g. This is the heat released due to the crystallization of polylactic acid. Also, the composition was cooled to −100° C. and heated again to 200° C. at a rate of 10° C./min, and then the heat of crystal fusion was measured to be 35 J/g. As can be understood from the ratio of the heat of crystallization to the heat of crystal fusion, crystallization proceeded by only 17% during the course of rapid cooling. That is, the branched polylactic acid was not able to sufficiently facilitate the crystallization of polylactic acid. This shows that the low crystallizability of the added branched polylactic acid results in reduced frequency of polylactic acid crystal nucleus generation and also in a low degree of crystallization.

Example 16

A branched polylactic acid in which the hydrogen in a terminal hydroxyl group was substituted with an acyl group derived from sodium phthalate was produced in the same manner as in Example 13 except that 56 parts by weight of castor oil was used in place of 25 parts by weight of castor oil.

The molecular weight of the resulting branched polylactic acid was determined using GPC, and it was found that the number-average molecular weight was 2500, the molecular weight distribution (Mw/Mn) was 2.1, and the branched polylactic acid molecule having a molecular weight of 3000 or less accounted for 76%. The melting point of the resulting branched polylactic acid was 84° C. This branched polylactic acid was thermally melted at 200° C., kept for 5 minutes, and cooled to 20° C. at a rate of 100° C./min using DSC, and then no heat release was measured. That is, no crystallization of the branched polylactic acid occurred. It can be understood that reduction in molecular weight of the branched polylactic acid resulted in inhibition of crystallization and in significantly reduced crystallizability.

20 parts by weight of this branched polylactic acid and 80 parts by weight of polylactic acid (a weight-average molecular weight of 100000) were melt-blended at 180° C. using a Labo Plastomill to give a polylactic acid resin composition in a lump form. This mixture was thermally melted at 200° C., kept for 5 minutes, and cooled to 20° C. at a rate of 100° C./min using DSC, and then no heat release was measured. This shows that no crystallization of polylactic acid occurred. Also, the composition was cooled to −100° C. and heated again to 200° C. at a rate of 10° C./min, and then the heat of crystal fusion was measured to be 31 J/g. It can be understood crystallization did not proceed at all during the course of rapid cooling despite that polylactic acid is crystallizable. That is; the branched polylactic acid was not able to facilitate the crystallization of polylactic acid at all. This shows that the significantly low crystallizability of the added branched polylactic acid results in reduced frequency of polylactic acid crystal nucleus generation and also in a low degree of crystallization.

Example 17

A branched polylactic acid in which the hydrogen in a terminal hydroxyl group was substituted with an acyl group derived from sodium phthalate was produced in the same manner as in Example 13 except that 29 parts by weight of castor oil was used in place of 25 parts by weight of castor oil.

The molecular weight of the resulting branched polylactic acid was determined using GPC, and it was found that the number-average molecular weight was 4000, the molecular weight distribution (Mw/Mn) was 2.4, and the branched polylactic acid molecule having a molecular weight of 3000 or less accounted for 24%. The melting point of the resulting branched polylactic acid was 80° C. This branched polylactic acid was thermally melted at 200° C., kept for 5 minutes, and cooled to 20° C. at a rate of 100° C./min using DSC, and then a heat of crystallization of 12 J/g was measured at 95° C. It can be understood that this heat release was due to crystallization, but the increased proportion of low-molecular branched polylactic acid molecules contained in the branched polylactic acid resulted in inhibition of crystallization and in poor crystallizability.

20 parts by weight of this branched polylactic acid and 80 parts by weight of polylactic acid (a weight-average molecular weight of 100000) were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 10 J/g. This is the heat released due to the crystallization of polylactic acid. Also, the composition was cooled to −100° C. and heated again to 200° C. at a rate of 10° C./min, and then the heat of crystal fusion was measured to be 35 J/g. As can be understood from the ratio of the heat of crystallization to the heat of crystal fusion, crystallization proceeded by only 29% during the course of rapid cooling. That is, the branched polylactic acid was not able to sufficiently facilitate the crystallization of polylactic acid. This shows that the low crystallizability of the added branched polylactic acid results in reduced frequency of polylactic acid crystal nucleus generation and also in a low degree of crystallization.

When the heat of crystallization of a branched polylactic acid is less than 20 J/g in cooling at a rate of 100° C./min following melted, the crystallizability of the branched polylactic acid is low. When such a branched polylactic acid is blended with a polylactic acid, the frequency of crystal nucleus generation of polulactic acid is reduced, thus failing to facilitate the crystallization of polylactic acid.

Example 18

90 parts by weight of dehydrated lactic acid obtained by heating 100 parts by weight of L-lactic acid (manufactured by Wako Pure Chemical Industries, Ltd., 90 v/v % aqueous solution) under reduced pressure and 9.1 parts by weight of initiator castor oil (manufactured by Wako Pure Chemical Industries, Ltd.) were mixed, and 1 part by weight of tin 2-ethylhexanoate was added as a catalyst. This mixture was heated to 150° C. under a nitrogen atmosphere with thoroughly stirred, kept at atmospheric pressure for 5 hours, at a reduced pressure of 13000 Pa for 2 hours, at a reduced pressure of 4000 Pa for 2 hours and a reduced pressure of 2600 Pa for 2 hours, and then heated to 180° C. and kept at a reduced pressure of 1300 Pa for 2 hours to give a polymer. The molecular weight of the resulting polymer was determined using GPC, and it was found that the number-average molecular weight was 8000. The molecular weight determined by GPC was conformed well to the molecular weight calculated based on the ratio of the starting materials, thereby establishing that no polylactic acid homopolymer was generated and only branched polylactic acid for which castor oil served as an initiator was obtained.

Next, to this branched polylactic acid, phthalic anhydride dissolved in pyridine was added and heated at 98° C. for 2 hours. The resulting pyridine solution was neutralized with aqueous sodium hydroxide. White deposits precipitated by neutralization were separated and collected by centrifugation and then washed with water to give a branched polylactic acid in which the hydrogen in a terminal hydroxy group was substituted with an acyl group derived from sodium phthalate.

The molecular weight of the resulting branched polylactic acid was determined using GPC, and it was found that the number-average molecular weight was 9000, the molecular weight distribution (Mw/Mn) was 1.6, and the branched polylactic acid molecule having a molecular weight of 3000 or less accounted for no more than 1%. The melting point of the resulting branched polylactic acid was 130° C. This branched polylactic acid was thermally melted at 200° C., kept for 5 minutes, and cooled to 20° C. at a rate of 100° C./min using DSC, and then a heat of crystallization of 31 J/g was measured at 115° C. Since this heat release was due to crystallization, it can be understood that the branched polylactic acid with the substitution of the terminal hydroxy group was a highly crystallizable polymer.

20 parts by weight of this branched polylactic acid, 80 parts by weight of polylactic acid (a weight-average molecular weight of 100000), and 1 part by weight of talc were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 50 J/g. This is the heat released due to the crystallization of polylactic acid. It can be understood that since the heat of crystallization was greater than that in Example 11, the crystallizability of polylactic acid was increased. It is believed that talc served as a crystal nucleus for the branched polylactic acid, thus facilitating the crystallization of the branched polylactic acid, and then the crystal of the branched polylactic acid served as a crystal nucleus for the polylactic acid, thus facilitating the crystallization of the polylactic acid. It is believed that crystal of the polylactic acid grows so as to conform to the crystal of the branched polylactic acid, and thus a polylactic acid resin composition having a very high crystallinity as a whole is obtained.

Example 19

90 parts by weight of dehydrated lactic acid obtained by heating 100 parts by weight of L-lactic acid (manufactured by Wako Pure Chemical Industries, Ltd., 90 v/v % aqueous solution) under reduced pressure and 9.1 parts by weight of initiator castor oil (manufactured by Wako Pure Chemical Industries, Ltd.) were mixed, and 1 part by weight of tin 2-ethylhexanoate was added as a catalyst. This mixture was heated to 150° C. under a nitrogen atmosphere while being thoroughly stirred, kept at atmospheric pressure for 5 hours, at a reduced pressure of 13000 Pa for 2 hours, at a reduced pressure of 4000 Pa for 2 hours and a reduced pressure of 2600 Pa for 2 hours, and then heated to 180° C. and kept at a reduced pressure of 1300 Pa for 2 hours to give a polymer. The molecular weight of the resulting polymer was determined using GPC, and it was found that the number-average molecular weight was 8000. The molecular weight determined by GPC was conformed well to the molecular weight calculated based on the ratio of the starting materials, thereby establishing that no polylactic acid homopolymer was generated and only branched polylactic acid for which castor oil served as an initiator was obtained.

Next, to this branched polylactic acid, phthalic anhydride dissolved in pyridine was added and heated at 98° C. for 2 hours. The resulting pyridine solution was neutralized with aqueous sodium hydroxide. White deposits precipitated by neutralization were separated and collected by centrifugation and then washed with water to give a branched polylactic acid in which the hydrogen in a terminal hydroxy group was substituted with an acyl group derived from sodium phthalate.

The molecular weight of the resulting branched polylactic acid was determined using GPC, and it was found that the number-average molecular weight was 9000, the molecular weight distribution (Mw/Mn) was 1.6, and the branched polylactic acid molecule having a molecular weight of 3000 or less accounted for no more than 1%. The melting point of the resulting branched polylactic acid was 130° C. This branched polylactic acid was thermally melted at 200° C., kept for 5 minutes, and cooled to 20° C. at a rate of 100° C./min using DSC, and then a heat of crystallization of 31 J/g was measured at 115° C. Since this heat release was due to crystallization, it can be understood that the branched polylactic acid with the substitution of the terminal hydroxy group was a highly crystallizable polymer.

20 parts by weight of this branched polylactic acid, 80 parts by weight of polylactic acid (a weight-average molecular weight of 100000), and 1 part by weight of polypropylene glycol were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 54 J/g. It can be understood that since the heat of crystallization was greater than that in Example 11, the crystallizability of polylactic acid was increased. It is believed that polypropylene glycol as a plasticizer facilitated the mobility of the branched polylactic acid, thus facilitating the crystal growth of the branched polylactic acid, thus facilitating the crystallization of the branched polylactic acid, and then the crystal of the branched polylactic acid served as a crystal nucleus for the polylactic acid, thus facilitating the crystallization of the polylactic acid. It is believed that crystal of the polylactic acid grows so as to conform to the crystal of the branched polylactic acid, and thus a polylactic acid resin composition having a very high crystallinity as a whole is obtained.

Example 20

20 parts by weight of the branched polylactic acid obtained in Example 11 and 80 parts by weight of polylactic acid (a weight-average molecular weight of 100000) were blended and extruded using a twin-screw extruder (KZW15TW, manufactured by Technovel Corporation) with the shearing force by two screws while gradually increasing the temperature from 90° C. to 180° C., and a strand discharged from the dice was then cooled in a water bath and pelletized by a pelletizer to give a polylactic acid resin composition in a pellet form. No clogging phenomenon such as blocking was observed in the extruder, enabling stable extrusion, strand formation, and pelletizing. The dried polylactic acid resin composition pellets were thermally melted at 200° C., kept for 5 minutes, and cooled to 20° C. at a rate of 100° C./min using DSC, and then the heat of crystallization was 41 J/g. This is the heat released due to the crystallization of polylactic acid. Also, the composition was cooled to −100° C. and heated again to 200° C. at a rate of 10° C./min, and then the heat of crystal fusion was measured to be 42 J/g. As can be understood from the ratio of the heat of crystallization to the heat of crystal fusion, crystallization proceeded by 98% during the course of rapid cooling.

Example 21

20 parts by weight of the branched polylactic acid obtained in Example 17 and 80 parts by weight of polylactic acid (a weight-average molecular weight of 100000) were blended and extruded using a twin-screw extruder (KZW15TW, manufactured by Technovel Corporation) with the shearing force by two screws while gradually increasing the temperature from 90° C. to 180° C. In the extruder, especially at the feeder portion, it was observed that only the low-melting branched polylactic acid was softened and melted, and adhered to the polylactic acid like an adhesive, thereby inhibiting screw rotation and kneading (blocking). The strand was discharged from the dice while receiving vibrations, failing to form a uniform diameter, and the discharge port was eventually blocked completely. It is believed that this was due to an excessively lower melting point (or softening point) of the branched polylactic acid than that of polylactic acid. This does not occur in a batch-type extruder, but it is a significant problem in a continuous extruder. To avoid this problem, it is necessary to add a branched polylactic acid having a melting point (or softening point) of at least 100° C.

Example 22

Polylactic acid resin composition pellets as obtained in Example 20 were molded with an injection molding machine (N100BII, manufactured by Japan Steel Works, Ltd.). Pellets were supplied from a hopper and injected into a mold warmed to 40° C., and then a molded article could be removed after 10 seconds from injection. This shows that the molded article was solidified within 10 seconds. Also, pellets were injected into a mold warmed to 100° C., and then a molded article could be removed after 20 seconds from injection. This shows that a sufficient crystallinity to maintain the shape of molded article was obtained within 20 seconds also at temperatures far higher than 57° C., which is the glass transition temperature of polylactic acid.

The upper temperature limit (low load) of strip was measured for the resulting injection-molded articles using a thermometer that measures a deflection temperature under load. The article molded with a mold at 40° C. showed a heat resistance of 100° C. and the article molded with a mold at 100° C. showed a heat resistance of 120° C.

Comparative Example 3

Polylactic acid (a weight-average molecular weight of 100000) was molded with an injection molding machine. Pellets were supplied from a hopper and injected into a mold warmed to 40° C., and then a molded article could be removed after 10 seconds from injection. This shows that the molded article was solidified within 10 seconds. However, pellets were injected into a mold warmed to 100° C., and then a molded article could not be removed even after 150 seconds from injection due to deformation. This shows that a sufficient crystallinity to maintain the shape of the molded article was not obtained within 150 seconds at temperatures far higher than 57° C., which is the glass transition temperature of polylactic acid.

The upper temperature limit (low load) of strip was measured for the resulting injection-molded article using a thermometer that measures a deflection temperature under load. The article molded with a mold at 40° C. showed a heat resistance of 55° C. This shows that the molded article was deformed at temperatures exceeding the glass transition temperature and was no longer able to maintain its shape since almost no crystallization of polylactic acid occurred.

Example 23

To 90 parts by weight of dehydrated lactic acid obtained by heating 100 parts by weight of L-lactic acid (manufactured by Wako Pure Chemical Industries, Ltd., 90 v/v % aqueous solution) under reduced pressure, 0.5 parts by weight of tin chloride and 0.5 parts by weight of p-toluenesulfonic acid were added as catalysts. This mixture was heated to 150° C. under a nitrogen atmosphere withe thoroughly stirred, kept at atmospheric pressure for 5 hours, at a reduced pressure of 13000 Pa for 2 hours, at a reduced pressure of 4000 Pa for 2 hours and a reduced pressure of 2600 Pa for 2 hours, and then heated to 180° C. and kept at a reduced pressure of 1300 Pa for 2 hours to give a polylactic acid. The molecular weight of the resulting polylactic acid was determined using GPC, and it was found that the number-average molecular weight was 5000.

100 parts by weight of this polylactic acid and 6.7 parts by weight of castor oil (manufactured by Wako Pure Chemical Industries, Ltd.) were blended and heated to 180° C. at a reduced pressure of 1300 Pa to give a polymer. The molecular weight of the resulting polymer was determined using GPC, and it was found that the number-average molecular weight was 15000. The molecular weight determined by GPC was conformed well to the molecular weight calculated based on the ratio of the starting materials, thereby establishing that no polylactic acid homopolymer was generated and only branched polylactic acid for which castor oil served as an initiator was obtained.

Next, to this branched polylactic acid, phthalic anhydride dissolved in pyridine was added and heated at 98° C. for 2 hours. The resulting pyridine solution was neutralized with aqueous sodium hydroxide. White deposits precipitated by neutralization were separated and collected by centrifugation and then washed with water to give a branched polylactic acid in which the hydrogen in a terminal hydroxy group was substituted with an acyl group derived from sodium phthalate.

The molecular weight of the resulting branched polylactic acid was determined using GPC, and it was found that the number-average molecular weight was 15000, the molecular weight distribution (Mw/Mn) was 1.2, and the branched polylactic acid molecule having a molecular weight of 3000 or less accounted for no more than 1%. The melting point of the resulting branched polylactic acid was 140° C. This branched polylactic acid was thermally melted at 200° C., kept for 5 minutes, and cooled to 20° C. at a rate of 100° C./min using DSC, and then a heat of crystallization of 36 J/g was measured at 116° C. Since this heat release was due to crystallization, it can be understood that the branched polylactic acid with the substitution of the terminal hydroxy group was a highly crystallizable polymer.

20 parts by weight of this branched polylactic acid and 80 parts by weight of polylactic acid (a weight-average molecular weight of 100000) were melt-blended at 180° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 41 J/g. This is the heat released due to the crystallization of polylactic acid. Also, the composition was cooled to −100° C. and heated again to 200° C. at a rate of 10° C./min, and then the heat of crystal fusion was measured to be 42 J/g. As can be understood from the ratio of the heat of crystallization to the heat of crystal fusion, crystallization proceeded by 98% during the course of rapid cooling.

Example 24

100 parts by weight of L-lactide (manufactured by Musashino Chemical Laboratory, Ltd.) and 8.9 parts by weight of initiator castor oil (manufactured by Wako Pure Chemical Industries, Ltd.) were mixed, and 0.5 parts by weight of tin 2-ethylhexanoate was added as a catalyst. This mixture was heated under an argon atmosphere at 130° C. for 20 hours to give a polymer.

Next, to this branched polylactic acid, phthalic anhydride dissolved in pyridine was added and heated at 98° C. for 2 hours. The resulting pyridine solution was neutralized with aqueous sodium hydroxide. White deposits precipitated by neutralization were separated and collected by centrifugation and then washed with water to give a branched polylactic acid in which the hydrogen in a terminal hydroxy group was substituted with an acyl group derived from sodium phthalate.

The glass transition temperature of the resulting branched polylactic acid was measured using DSC, and it was found to be 30.0° C. Also, the branched polylactic acid was thermally melted at 200° C., kept for 5 minutes, and cooled to 20° C. at a rate of 100° C./min, and then the heat of crystallization was measured to be 32 J/g. Since this heat release was due to crystallization, it can be understood that the branched polylactic acid with the substitution of the terminal hydroxy group was a highly crystallizable polymer.

Example 25

A branched polylactic acid in which the hydrogen in a terminal hydroxyl group was substituted with an acyl group derived from sodium phthalate was produced in the same manner as in Example 24 except that 11.1 parts by weight of castor oil was used in place of 8.9 parts by weight of castor oil.

The glass transition temperature of the resulting branched polylactic acid was measured using DSC, and it was found to be 24.5° C. Also, the branched polylactic acid was thermally melted at 200° C., kept for 5 minutes, and cooled to 20° C. at a rate of 100° C./min, and then the heat of crystallization was measured to be 43 J/g. Since this heat release was due to crystallization, it can be understood that the branched polylactic acid with the substitution of the terminal hydroxy group was a highly crystallizable polymer.

Example 26

A branched polylactic acid in which the hydrogen in a terminal hydroxyl group was substituted with an acyl group derived from sodium phthalate was produced in the same manner as in Example 24 except that 12.7 parts by weight of castor oil was used in place of 8.9 parts by weight of castor oil.

The glass transition temperature of the resulting branched polylactic acid was measured using DSC, and it was found to be 13.6° C. Also, the branched polylactic acid was thermally melted at 200° C., kept for 5 minutes, and cooled to 20° C. at a rate of 100° C./min, and then the heat of crystallization was measured to be 48 J/g. Since this heat release was due to crystallization, it can be understood that the branched polylactic acid with the substitution of the terminal hydroxy group was a highly crystallizable polymer.

Example 27

A branched polylactic acid in which the hydrogen in a terminal hydroxyl group was substituted with an acyl group derived from sodium phthalate was produced in the same manner as in Example 24 except that 7.43 parts by weight of castor oil was used in place of 8.9 parts by weight of castor oil.

The glass transition temperature of the resulting branched polylactic acid was measured using DSC, and it was found to be 42.7° C. Also, the branched polylactic acid was thermally melted at 200° C., kept for 5 minutes, and cooled to 20° C. at a rate of 100° C./min, and then the heat of crystallization was measured to be 20 J/g. The crystallizability of the branched polylactic acid could be developed while lower than in Examples 24 to 26.

Example 28

90 parts by weight of dehydrated lactic acid obtained by heating under reduced pressure 100 parts by weight of L-lactic acid (90 v/v % aqueous solution, an optical purity of 98%) obtained by purifying a lactic acid fermentation liquor obtained by starch fermentation and 9 parts by weight of initiator castor oil (manufactured by Wako Pure Chemical Industries, Ltd.) were mixed, and 0.5 part by weight of tin 2-ethylhexanoate was added as a catalyst. This mixture was heated to 150° C. under a nitrogen atmosphere with thoroughly stirred, kept at atmospheric pressure for 5 hours, at a reduced pressure of 13000 Pa for 2 hours, at a reduced pressure of 4000 Pa for 2 hours and a reduced pressure of 2600 Pa for 2 hours, and then heated to 180° C. and kept at a reduced pressure of 1300 Pa for 2 hours to give a polymer.

Next, to this branched polylactic acid, phthalic anhydride dissolved in pyridine was added and heated at 98° C. for 2 hours. The resulting pyridine solution was neutralized with aqueous sodium hydroxide. White deposits precipitated by neutralization were separated and collected by centrifugation and then washed with water to give a branched polylactic acid in which the hydrogen in a terminal hydroxy group was substituted with an acyl group derived from sodium phthalate.

The resulting branched polylactic acid was thermally melted at 200° C., kept for 5 minutes, and cooled to 20° C. at a rate of 100° C./min using DSC, and then the heat of crystallization was measured to be 30 J/g. Since this heat release was due to crystallization, it can be understood that the branched polylactic acid with the substitution of the terminal hydroxy group was a highly crystallizable polymer.

Example 29

A branched polylactic acid in which the hydrogen in a terminal hydroxyl group was substituted with an acyl group derived from sodium phthalate was produced in the same manner as in Example 28 except that 100 parts by weight of L-lactic acid (an optical purity of 94%) was used in place of 100 parts by weight of L-lactic acid (an optical purity of 98%).

The resulting branched polylactic acid was thermally melted at 200° C., kept for 5 minutes, and cooled to 20° C. at a rate of 100° C./min using DSC, and then the heat of crystallization was measured to be 22 J/g. Since this heat release was due to crystallization, it can be understood that the branched polylactic acid with the substitution of the terminal hydroxy group was a highly crystallizable polymer.

Example 30

A branched polylactic acid in which the hydrogen in a terminal hydroxyl group was substituted with an acyl group derived from sodium phthalate was produced in the same manner as in Example 28 except that 100 parts by weight of L-lactic acid (an optical purity of 90%) was used in place of 100 parts by weight of L-lactic acid (an optical purity of 98%).

The resulting branched polylactic acid was thermally melted at 200° C., kept for 5 minutes, and cooled to 20° C. at a rate of 100° C./min using DSC, and then the heat of crystallization was measured to be 7 J/g. Crystallizability was lower than that in Examples 28 and 29.

Example 31

A branched polylactic acid in which hydrogen in a terminal hydroxyl group was substituted with an acyl group derived from sodium phthalate was produced in the same manner as in Example 28 except that 100 parts by weight of L-lactic acid (an optical purity of 80%) was used in place of 100 parts by weight of L-lactic acid (an optical purity of 98%).

The resulting branched polylactic acid was thermally melted at 200° C., kept for 5 minutes, and cooled to 20° C. at a rate of 100° C./min using DSC, and then no heat release phenomenon was observed.

Example 32

10 parts by weight of the branched polylactic acid obtained in Example 14, 90 parts by weight of polylactic acid (a weight-average molecular weight of 100000), and 10 parts by weight of acetyl tributyl citrate were melt-blended at 170° C. using a Labo Plastomill to give a polylactic acid resin composition in a lump form. This composition was thermally melted at 200° C., kept for 5 minutes, and cooled to 20° C. at a rate of 100° C./min using DSC, and then a heat of crystallization of 41 J/g was measured at 88° C. A polylactic acid resin composition having a high crystallinity could be thus obtained.

Example 33

10 parts by weight of the branched polylactic acid obtained in Example 14, 90 parts by weight of polylactic acid (a weight-average molecular weight of 100000), and 10 parts by weight of triethylene glycol dimethyl ether were melt-blended at 170° C. using a Labo Plastomill to give a polylactic acid resin composition in a lump form. This composition was thermally melted at 200° C., kept for 5 minutes, and cooled to 20° C. at a rate of 100° C./min using DSC, and then a heat of crystallization of 41 J/g was measured at 104° C. A polylactic acid resin composition having a high crystallinity could be thus obtained.

Example 34

10 parts by weight of the branched polylactic acid obtained in Example 14 and 90 parts by weight of polylactic acid (a weight-average molecular weight of 100000) were melt-blended at 170° C. using a Labo Plastomill to give a polylactic acid resin composition in a lump form. This composition was thermally melted at 200° C., kept for 5 minutes, and cooled to 20° C. at a rate of 100° C./min using DSC, and then the heat of crystallization was measured to be 25 J/g. While the crystallinity of the polylactic acid resin composition was lower than that in Examples 14, 32, and 33, it was observed that the enhancement of crystallinity brought about by the additive (the branched polylactic acid).

Example 35

8 parts by weight of the branched polylactic acid obtained in Example 14, 92 parts by weight of polylactic acid (a weight-average molecular weight of 100000), and 8 parts by weight of acetyl tributyl citrate were blended and extruded using a twin-screw extruder (KZW15TW, manufactured by Technovel Corporation) with the shearing force by two screws while gradually increasing the temperature from 90° C. to 170° C., and a strand discharged from the dice was then cooled in a water bath and pelletized by a pelletizer to give a polylactic acid resin composition in a pellet form. No clogging phenomenon such as blocking was observed in the extruder, enabling stable extrusion, strand formation, and pelletizing. The dried polylactic acid resin composition pellets were molded with an injection molding machine (Toyo Machinery & Metal Co., Ltd., Si-801V). Pellets were supplied from a hopper and injected into a mold warmed to 90° C., and then a molded article could be removed after 30 seconds from injection. This shows that the molded article was solidified within 30 seconds. This shows that a sufficient crystallinity to maintain the shape of molded article was obtained within 30 seconds also at temperatures far higher than 57° C., which is the glass transition temperature of polylactic acid.

The upper temperature limit (low load) of strip was measured for the resulting injection-molded article using a thermometer that measures a deflection temperature under load. The article showed a heat resistance of 130° C.

Example 36

The branched polylactic acid obtained in Example 11 was extruded using a twin-screw extruder (KZW15TW, manufactured by Technovel Corporation) with two screws while gradually increasing the temperature from 90° C. to 150° C., and a strand discharged from the dice was then cooled in a water bath and pelletized by a pelletizer to give branched polylactic acid in a pellet form. Polylactic acid (a weight-average molecular weight of 160000) was pelletized in a similar manner.

Next, 2 kg of the branched polylactic acid pellets and 8 kg of the polylactic acid pellets (a weight-average molecular weight of 160000) were introduced into a plastic bag, and the bag was shaken to blend the pellets to give a polylactic acid resin composition.

This resin composition was molded with an injection molding machine (N100BII, manufactured by Japan Steel Works, Ltd.). The polylactic resin composition composed of the blend of the branched polylactic acid pellets and the polylactic acid pellets was supplied from a hopper and injected into a mold warmed to 40° C., and then a molded article could be removed after 10 seconds from injection. This shows that the molded article was solidified within 10 seconds. Also, pellets were injected into a mold warmed to 100° C., and then a molded article could be removed after 25 seconds from injection. This shows that a sufficient crystallinity to maintain the shape of molded article was obtained within 25 seconds also at temperatures far higher than 57° C., which is the glass transition temperature of polylactic acid.

The upper temperature limit (low load) of strip was measured for the resulting injection-molded articles using a thermometer that measures a deflection temperature under load. The article molded with a mold at 40° C. showed a heat resistance of 100° C. and the article molded with a mold at 100° C. showed a heat resistance of 120° C.

Example 37

40 parts by weight of the branched polylactic acid obtained in Example 14, 60 parts by weight of polylactic acid (a weight-average molecular weight of 100000), and 40 parts by weight of acetyl tributyl citrate were blended and extruded using a twin-screw extruder (KZW15TW, manufactured by Technovel Corporation) with the shearing force by two screws while gradually increasing the temperature from 90° C. to 170° C., and a strand discharged from the dice was then cooled in a water bath and pelletized by a pelletizer to give a polylactic resin composition in a pellet form (master batch). The polylactic acid resin composition pellet masterbatch was dried. No clogging phenomenon such as blocking was observed in the extruder, enabling stable extrusion, strand formation, and pelletizing. 3 kg of the dried polylactatic acid resin composition pellets and 12 kg of polylactic acid pellets (a weight-average molecular weight of 100000) were introduced into a plastic bag, and the bag was shaken to blend the pellets to give a polylactic acid resin composition.

This resin composition was molded with an injection molding machine (Toyo Machinery & Metal Co., Ltd., Si-80IV). The blended pellets were supplied from a hopper and injected into a mold warmed to 90° C., and then a molded article could be removed after 30 seconds from injection. This shows that the molded article was solidified within 30 seconds. This shows that a sufficient crystallinity to maintain the shape of molded article was obtained within 30 seconds also at temperatures far higher than 57° C., which is the glass transition temperature of polylactic acid.

The upper temperature limit (low load) of strip was measured for the resulting injection-molded article using a thermometer that measures a deflection temperature under load. The article showed a heat resistance of 130° C.

Example 38

90 parts by weight of dehydrated lactic acid obtained by heating 100 parts by weight of L-lactic acid (manufactured by Wako Pure Chemical Industries, Ltd., 90 v/v % aqueous solution) under reduced pressure and 2.1 parts by weight of initiator glycerol (manufactured by Wako Pure Chemical Industries, Ltd.) were mixed, and 1 part by weight of tin 2-ethylhexanoate was added as a catalyst. This mixture was heated to 150° C. under a nitrogen atmosphere with thoroughly stirred, kept at atmospheric pressure for 5 hours, at a reduced pressure of 13000 Pa for 2 hours, at a reduced pressure of 4000 Pa for 2 hours and a reduced pressure of 2600 Pa for 2 hours to give a polymer. The molecular weight of the resulting polymer was determined using GPC, and it was found that the number-average molecular weight was 4000. The molecular weight determined by GPC was conformed well to the molecular weight calculated based on the ratio of the starting materials, thereby establishing that no polylactic acid homopolymer was generated and only branched polylactic acid for which glycerol served as an initiator was obtained.

Next, to this branched polylactic acid, acetic anhydride and imidazole dissolved in pyridine were added and refluxed for 30 minutes. The resulting pyridine solution was neutralized with aqueous sodium hydroxide. After neutralization, chloroform extraction and then water washing were performed to give a branched polylactic acid in which the hydrogen in a terminal hydroxyl group was substituted with an acetyl group.

10 parts by weight of this branched polylactic acid, 10 parts by weight of the branched polylactic acid obtained in Example 11, and 80 parts by weight of polylactic acid (a weight-average molecular weight of 100000) were blended and extruded using a twin-screw extruder (KZW15TW, manufactured by Technovel Corporation) with the shearing force by two screws while gradually increasing the temperature from 90° C. to 180° C., and a strand discharged from the dice was then cooled in a water bath and pelletized by a pelletizer to give a polylactic resin composition in a pellet form, and this composition was dried. No clogging phenomenon such as blocking was observed in the extruder, enabling stable extrusion, strand formation, and pelletizing. The dried polylactic acid resin composition pellets were thermally melted at 200° C., kept for 5 minutes, and cooled to 20° C. at a rate of 100° C./min using DSC, and then the heat of crystallization was 36 J/g. This is the heat released due to the crystallization of polylactic acid. Also, the composition was cooled to −100° C. and heated again to 200° C. at a rate of 10° C./min, and then the heat of crystal fusion was measured to be 42 J/g. As can be understood from the ratio of the heat of crystallization to the heat of crystal fusion, crystallization proceeded by 86% during the course of rapid cooling.

Next, the polylactic acid resin composition pellets were molded with an injection molding machine (N100BII, manufactured by Japan Steel Works, Ltd.). Pellets were supplied from a hopper and injected into a mold warmed to 40° C., and then a molded article could be removed after 15 seconds from injection. This shows that the molded article was solidified within 15 seconds. Also, pellets were injected into a mold warmed to 100° C., and then a molded article could be removed after 30 seconds from injection. This shows that a sufficient crystallinity to maintain the shape of molded article was obtained within 30 seconds also at temperatures far higher than 57° C., which is the glass transition temperature of polylactic acid.

The upper temperature limit (low load) of strip was measured for the resulting injection-molded articles using a thermometer that measures a deflection temperature under load. The article molded with a mold at 100° C. showed a heat resistance of 115° C.

Example 39

90 parts by weight of dehydrated lactic acid obtained by heating 100 parts by weight of L-lactic acid (manufactured by Wako Pure Chemical Industries, Ltd., 90 v/v % aqueous solution) under reduced pressure and 9.1 parts by weight of initiator castor oil (manufactured by Wako Pure Chemical Industries, Ltd.) were mixed, and 1 part by weight of tin 2-ethylhexanoate was added as a catalyst. This mixture was heated to 150° C. under a nitrogen atmosphere with thoroughly stirred, kept at atmospheric pressure for 5 hours, at a reduced pressure of 13000 Pa for 2 hours, at a reduced pressure of 4000 Pa for 2 hours and a reduced pressure of 2600 Pa for 2 hours, and then heated to 180° C. and kept at a reduced pressure of 1300 Pa for 2 hours to give a polymer. The molecular weight of the resulting polymer was determined using GPC, and it was found that the number-average molecular weight was 8000. The molecular weight determined by GPC was conformed well to the molecular weight calculated based on the ratio of the starting materials, thereby establishing that no polylactic acid homopolymer was generated and only branched polylactic acid for which castor oil served as an initiator was obtained.

Next, to this branched polylactic acid, acetic anhydride and imidazole dissolved in pyridine were added and refluxed for 30 minutes. The resulting pyridine solution was neutralized with aqueous sodium hydroxide. White deposits precipitated by neutralization were separated and recovered by centrifugation and then washed with water to give a branched polylactic acid in which the hydrogen in a terminal hydroxy group was substituted with an acetyl group.

100 parts by weight of the resulting branched polylactic acid and 10 parts by weight of disodium phthalate were blended and extruded using a twin-screw extruder (KZW15TW, manufactured by Technovel Corporation) with the shearing force by two screws while gradually increasing the temperature from 90° C. to 170° C., and a strand discharged from the dice was then cooled in a water bath and pelletized by a pelletizer to give a polylactic resin composition in a pellet form, and this composition was dried. No clogging phenomenon such as blocking was observed in the extruder, enabling stable extrusion, strand formation, and pelletizing. 1 kg of the dried polylactatic acid resin composition pellets and 9 kg of similarly pelletized polylactic acid pellets (a weight-average molecular weight of 100000) were introduced into a plastic bag, and the bag was shaken to blend the pellets to give a polylactic acid resin composition.

This resin composition was molded with an injection molding machine (Toyo Machinery & Metal Co., Ltd., Si-801V). The blended pellets were supplied from a hopper and injected into a mold warmed to 90° C., and then a molded article could be removed after 30 seconds from injection. This shows that the molded article was solidified within 30 seconds. This shows that a sufficient crystallinity to maintain the shape of molded article was obtained within 30 seconds also at temperatures far higher than 57° C., which is the glass transition temperature of polylactic acid.

The upper temperature limit (low load) of strip was measured for the resulting injection-molded article using a thermometer that measures a deflection temperature under load. The article showed a heat resistance of 120° C.

Industrial Applicability

The additive for polylactic acid resin of the present invention, once blended with polylactic acid, can enhance the flexibility and heat resistance of polylactic acid. The polylactic acid resin composition of the present invention has a level of flexibility that has heretofore not been achieved, and it is expected that the polylactic acid resin composition is used as a film or the like in broader applications such as agricultural materials, fishery materials, civil engineering materials, food packaging, medical and nursing products, clothing fiber, furniture, office supplies, miscellaneous articles, articles of daily use, and the like. The polylactic acid resin composition of the present invention also has excellent heat resistance, and it is expected that the polylactic acid resin composition is used in broader applications such as automobiles, household electrical appliances, and various industrial products required to be heat resistant. Furthermore, the polylactic acid resin composition of the present invention has a polylactic acid of the base resin and a branched polylactic acid of the additive both derived from plant, and it is expected that the polylactic acid resin composition is effective in global warming prevention through carbon dioxide reduction and in resource conservation through not using petroleum.

The invention claimed is:

1. A method for producing a polylactic acid resin composition, which comprises:
    melt-blending an additive for polylactic acid resin and a polylactic acid, wherein the additive for polylactic acid resin comprises a branched polylactic acid that has three branched chains composed of a polylactic acid in the molecule,
    wherein the branched polylactic acid having a number-average molecular weight of 5000 to 13320,
    wherein the branched polylactic acid is obtained by polymerizing lactide, lactic acid, or polylactic acid using as an initiator castor oil,
    wherein the branched polylactic acid comprises a branched polylactic acid molecule in which a hydrogen is substituted with an acyl group in at least one of the terminal hydroxy groups of the branched chains composed of the polylactic acid, and
    wherein the acyl group is represented by the formula: R—CO—, where R is an unsaturated hydrocarbon residue having 2 to 14 carbon atoms.

2. A method according to claim 1, wherein 1 to 30 parts by weight of the additive for polylactic acid resin is melt-blended with 100 parts by weight of the polylactic acid.

3. A method according to claim 1, wherein 0.1 to 5 parts by weight of talc or mica is further melt-blended.

4. A method according to claim 1, wherein 0.1 to 5 parts by weight of polyethylene glycol or polypropylene glycol is further melt-blended.

5. A method according to claim 1, wherein 1 to 30 parts by weight of at least one selected from the group consisting of diethylene glycol diacetate, ethylene glycol dibenzoate, diethylene glycol dibutyl ether, diethylene glycol diethyl ether, diethylene glycol dimethyl ether, monoolein, triacetin, tributyrin, triethylene glycol diacetate, triethylene glycol dimethyl ether, acetyl tributyl citrate, acetyl triethyl citrate, methyl acetyl ricinolate, adipic acid diester, fumaric acid diester, maleic acid diester, and sebacic acid diester is further melt-blended.

6. A method according to claim 1, which further comprises processing the polylactic acid resin composition into a granulated form.

7. A method according to claim 1, wherein the branched polylactic acid has a glass transition temperature of 30° C. or less.

* * * * *